United States Patent
Matsumura et al.

(10) Patent No.: US 6,487,053 B1
(45) Date of Patent: Nov. 26, 2002

(54) SYSTEM FOR IMPROVED ASSEMBLY AND MANUFACTURE OF MINIATURE DATA RECORDING DEVICES AND HEAD STACK ASSEMBLIES

(75) Inventors: Satoshi Matsumura, Kawasaki (JP); Thomas R. Albrecht, San Jose, CA (US); David W. Albrecht, San Jose, CA (US); Kenji Kuroki, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,507

(22) Filed: Feb. 11, 2000

(30) Foreign Application Priority Data

Feb. 12, 1999 (JP) .......................................... 11-034261

(51) Int. Cl.$^7$ .............................................. G11B 21/02
(52) U.S. Cl. .................................................. 360/265.7
(58) Field of Search ........................... 360/265.7, 244.5, 360/244.7, 265.9, 265.6, 264.2, 245.2, 264.4; 310/13

(56) References Cited

U.S. PATENT DOCUMENTS

| | | | |
|---|---|---|---|
| 5,550,694 A | | 8/1996 | Hyde |
| 5,677,815 A | * | 10/1997 | Chan ........................ 360/264.2 |
| 5,691,581 A | * | 11/1997 | Umehara et al. .............. 310/13 |
| 5,828,521 A | * | 10/1998 | Hasegawa ................ 360/265.6 |
| 5,862,019 A | * | 1/1999 | Larson ........................ 310/13 |
| 5,894,382 A | | 4/1999 | Hyde |
| 6,052,258 A | | 4/2000 | Albrecht et al. |
| 2001/0030838 A1 | * | 10/2001 | Takadera et al. ......... 360/245.2 |
| 2002/0039259 A1 | * | 4/2002 | Koyama et al. ......... 360/264.4 |

FOREIGN PATENT DOCUMENTS

| | | |
|---|---|---|
| JP | 03-080479 | 4/1991 |
| JP | 07-211021 | 8/1995 |
| JP | 08-190769 | 7/1996 |
| JP | 09-017138 | 1/1997 |
| JP | 09-251734 | 9/1997 |
| JP | 10-112145 | 4/1998 |
| WO | WO9513610 A1 | 5/1995 |

* cited by examiner

Primary Examiner—Hoa T. Nguyen
Assistant Examiner—Tianjie Chen
(74) Attorney, Agent, or Firm—G. Marlin Knight; Robert B. Martin; Bracewell & Patterson, L.L.P.

(57) ABSTRACT

A head stack assembly for a data recording disk drive has a carriage on which a coil is mounted. The carriage has a first surface and a second surface. A first head gimbal assembly is mounted on the first surface, and a second head gimbal assembly is mounted on the second surface. A datum member is formed on each of the surfaces of the carriage. The datum member is used to position each of the head gimbal assemblies on their respective surfaces. The datum member has two pins that engage apertures in the head gimbal assemblies. A pivot member is located in a separate aperture between the pins such that the head stack assembly is balanced at the center of the pivot member.

10 Claims, 18 Drawing Sheets

SYSTEM FOR IMPROVED ASSEMBLY AND MANUFACTURE OF MINIATURE DATA RECORDING DEVICES AND HEAD STACK ASSEMBLIES

BACKGROUND OF THE INVENTION

1. Technical Field

The present invention relates in general to an improved data recording device, and in particular to improving the fabrication of miniature data recording devices. Even more particularly, the present invention relates to solving various problems associated with the manufacture and assembly of the components of miniature data recording disk drives, such as the head stack assembly.

2. Description of the Prior Art

Hard disk drive devices have been used as a data recording device of a personal computer. With the advance of technology, a data recording density has been increased, and a size of a hard disk, i.e., a magnetic data recording disk and a size of a housing have been decreased. The examples of the size, i.e., a diameter, of the previous hard disk are 3.5 inches (95 mm), 2.5 inches (65 mm), 1.9 inches (48 mm) and 1.3 inches (34 mm).

Referring now to FIG. 1, the structure of a prior hard disk drive device 1 is shown. The major parts of device 1, such as a hard disk 2, a head stack assembly 3, a magnet 4, an outer crash stop 5 made of rubber, an inner crash stop 6 made of rubber, a flexible cable 7 and a control unit 8 mounted on the flexible cable 7, are mounted within a housing 9. The hard disk 2 is supported by a shaft 10 which is rotated by a spindle motor, not shown. The head stack assembly 3 is pivotally moved around a pivot point 12. A voice coil 11 is mounted on the head stack assembly 3. The voice coil 11 and the magnet 4 constitute a voice coil motor. A current supplied to the voice coil 11 is controlled to move the head stack assembly 3 along a radial direction indicated by an arrow "A" to position a head on a head slider assembly 13 on a data recording track on the hard disk 2 to read data from the data recording track or to write the data into the data recording track. Electrical conductive wires on the flexible cable 7 connect the head and the voice coil 11 to the control unit 8.

FIG. 2 shows a structure of the prior art head stack assembly 3. A plurality of head gimbal assemblies 14 and spacers 15 are stacked on a carriage 16. A screw 18 is used to align the head gimbal assemblies 14, the spacers 15 and the carriage 16. A pivot cartridge 19 is inserted into the aperture and is fixed by a nut 20. A circuit substrate 21 connected to the flexible cable 7 is fixed to the carriage 16 by a screw 22. Each of the head gimbal assembly 14 includes an extended plate 23 on which connecting pads, not shown, electrically connected to the head are arranged. The extended plate 23 is cantilevered from the head gimbal assembly 14. The connecting pads, not shown, which are connected to the connecting pads of the extended plate 23, are arranged on the circuit substrate 21 and are connected to electrically conductive wires on the flexible cable 7. Electrically conductive wires 26 of the voice coil 11 are connected to connecting pads, not shown, on the circuit substrate 21.

Head gimbal assembly 14 has a plurality of parts including an arm assembly 24 and a suspension load beam 25. The arm assemblies 24 and load beam 25 of each of the head gimbal assemblies 14 must be aligned in order to precisely align each of the heads with respect to a center of the pivot point. In the larger, prior art hard disk drive devices (such as 95 mm form factor and 65 form factor), an external positioning jig is used to align the arm member 24 and the suspension load beam 25 since the size of the head stack assembly 3 is relatively large. See Japanese patent application 9-264596 (IBM Docket No.JA9-97-161), assigned to the assignee of the present invention. It is noted that the form factor represents the outer size or dimension of the housing of the hard disk drive device. The 95 mm form factor indicates the size, i.e., a width, a length and a height of the housing containing the 3.5 inch (95 mm) hard disk, and the 65 mm form factor indicates the size, i.e., a width, a length and a height of the housing containing the 2.5 inch (65 mm) hard disk.

The smaller hard disk drive devices, such as the 34 mm form factor (the size of the housing including the 34 mm (1.3 inches) hard disk) or the 27 mm form factor (the size of the housing including the 27 mm (1.0 inches) hard disk), have been recently developed. One problem associated with small size hard disk drive devices is that it is difficult to assemble the head gimbal assembly 14 on the carriage by using the external positioning jig since the size of the head gimbal assembly 14 is very small. Therefore, it is desirable to assemble the head gimbal assembly 14 on the carriage without using the external positioning jig.

Another problem associated with small disk drive devices is that it is difficult to assemble the discrete, inner and outer crash stops 5, 6 within the small space of the housing. A third problem with small disk drive devices is that it is difficult to affix the circuit plate 21 to the carriage 16 with the screw 22. A fourth problem with small disk drive devices is that it is difficult to connect the wires of the voice coil 11 to the connecting pads on the circuit substrate 21. Thus, there is a need to improve the ability to fabricate and assemble miniature hard disk drive devices.

SUMMARY OF THE INVENTION

A head stack assembly for a data recording disk drive has a carriage on which a coil is mounted. The carriage has a first surface and a second surface. A first head gimbal assembly is mounted on the first surface, and a second head gimbal assembly is mounted on the second surface. A datum member is formed on each of the surfaces of the carriage. The datum member is used to position each of the head gimbal assemblies on their respective surfaces. The datum member has two pins that engage apertures in the head gimbal assemblies. A pivot member is located in a separate aperture between the pins such that the head stack assembly is balanced at the center of the pivot member.

Accordingly, it is an object of the present invention to provide an improved data recording device.

It is an additional object of the present invention to improve the fabrication of miniature data recording devices.

Still another object of the present invention is to provide techniques for solving various problems associated with the manufacture and assembly of the components of miniature data recording disk drives, such as the head stack assembly.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
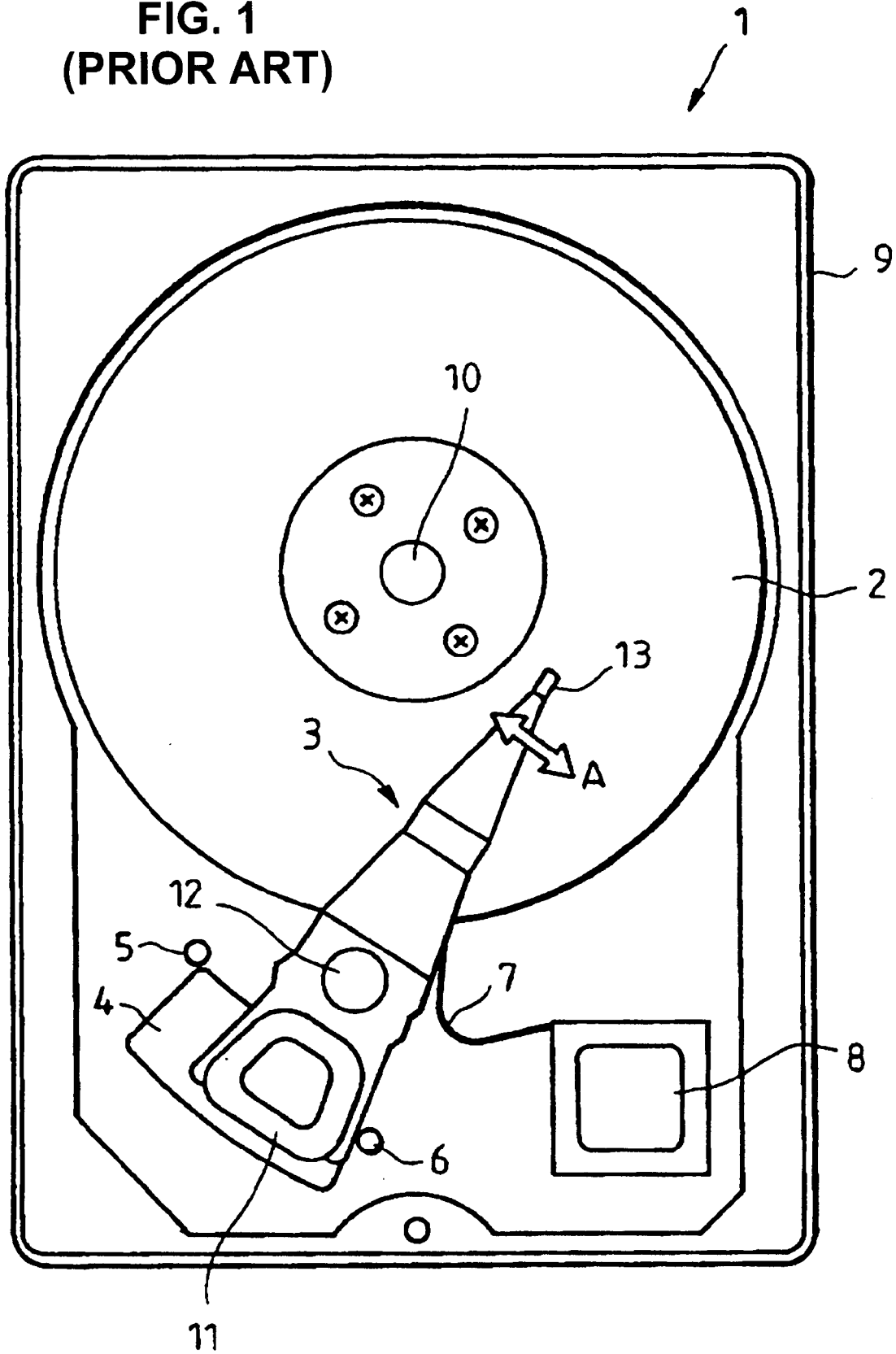
FIG. 1 is a plan view of a prior art hard disk drive device.
Figure 2:
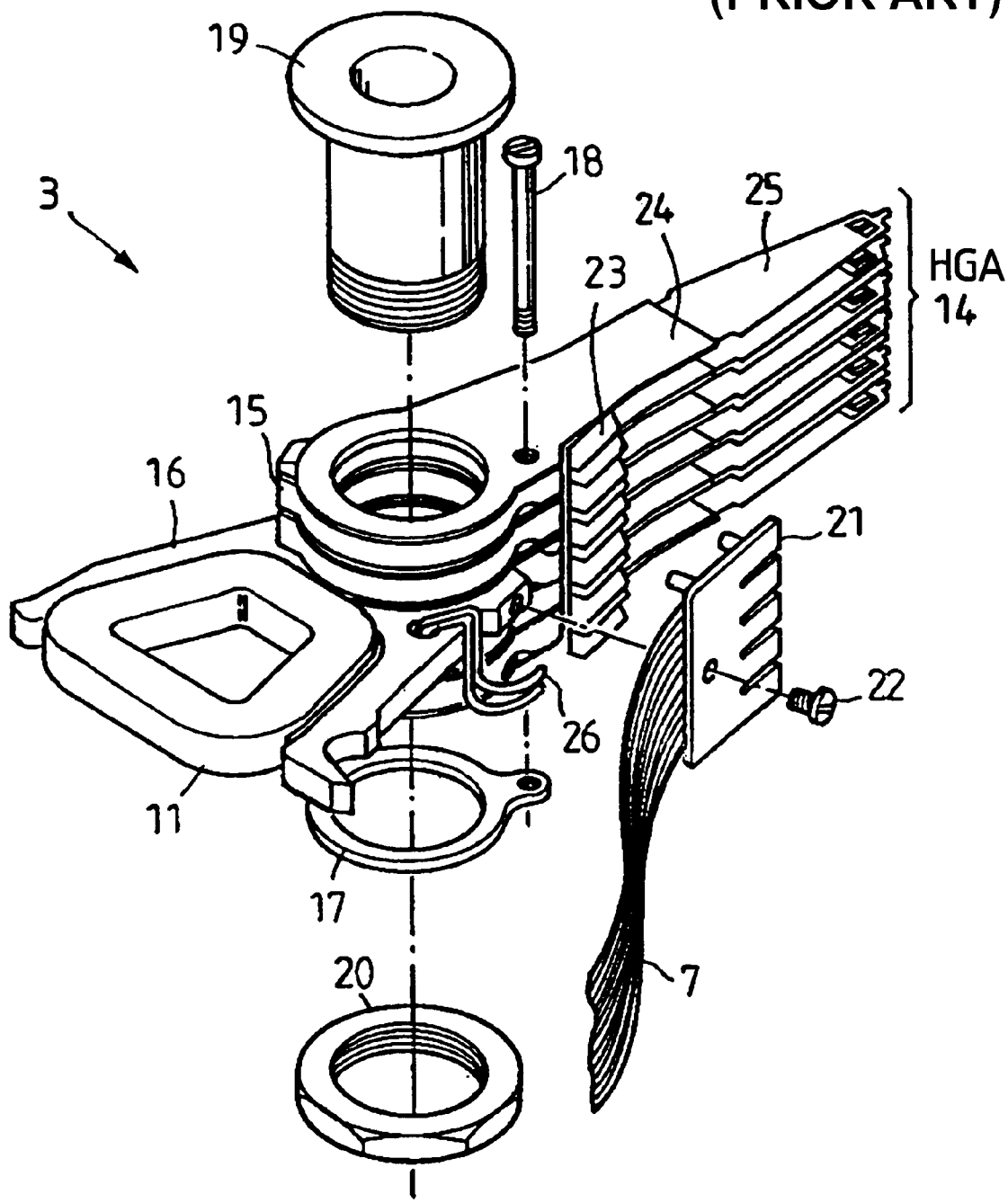
FIG. 2 is an exploded, isometric view of a prior head stack assembly for the device of FIG. 1.
Figure 3:
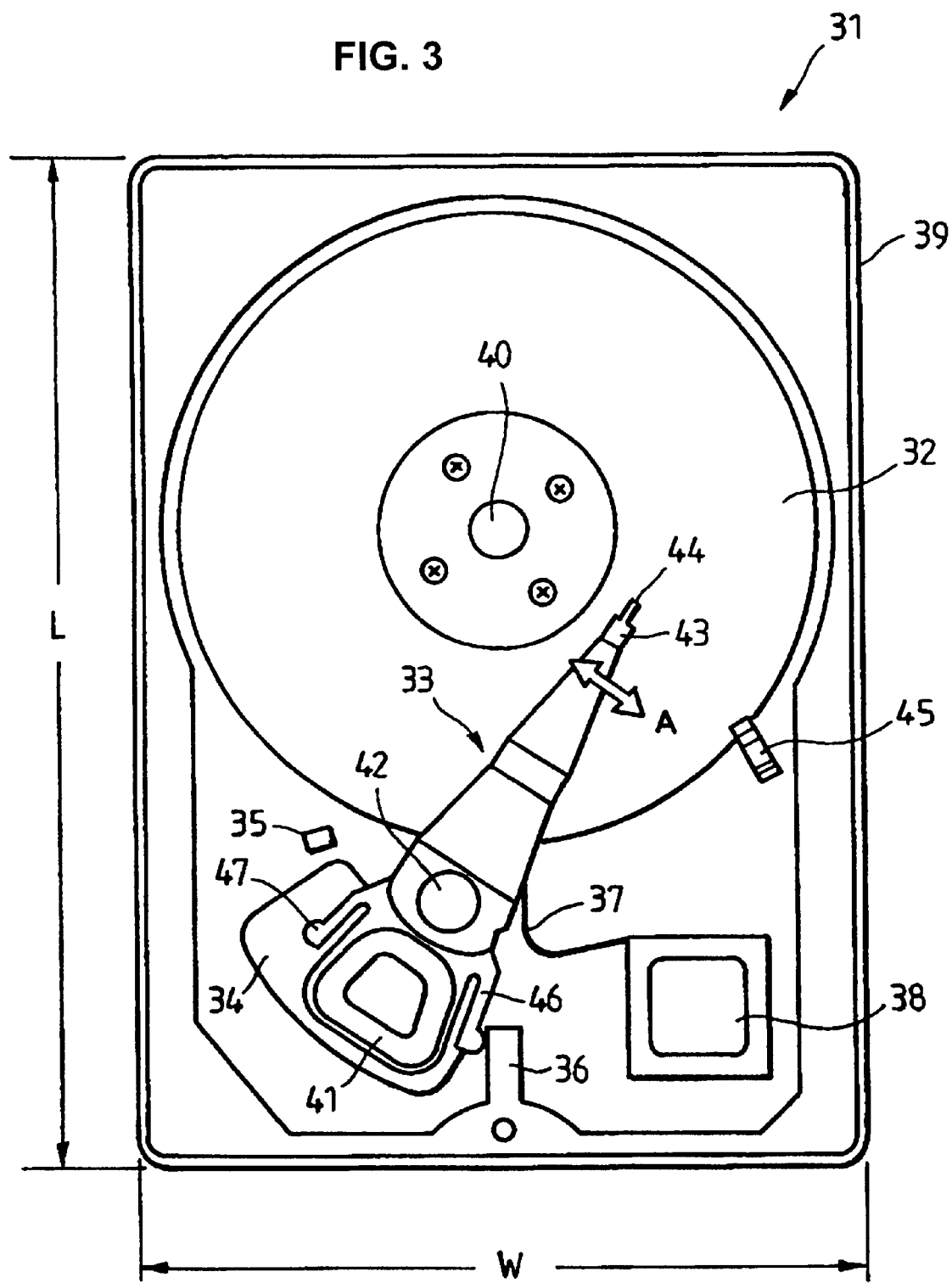
FIG. 3 is a plan view of a hard disk drive device constructed in accordance with the present invention.

Referring now to FIG. 3, a miniature hard disk drive device 31, such as the 27 mm (1.0 inch hard disk) form factor, is shown in accordance with the present invention. Major parts, such as a hard disk 32, a head stack assembly 33, a magnet 34, an outer crash stop 35 which is an extended portion of a metal frame of a housing 39, an inner crash stop 36 which is an extended portion of the metal frame of the housing 39, a flexible cable 37 and a control unit 38 mounted on the flexible cable 37, are mounted within the housing 39.

Figure 4:
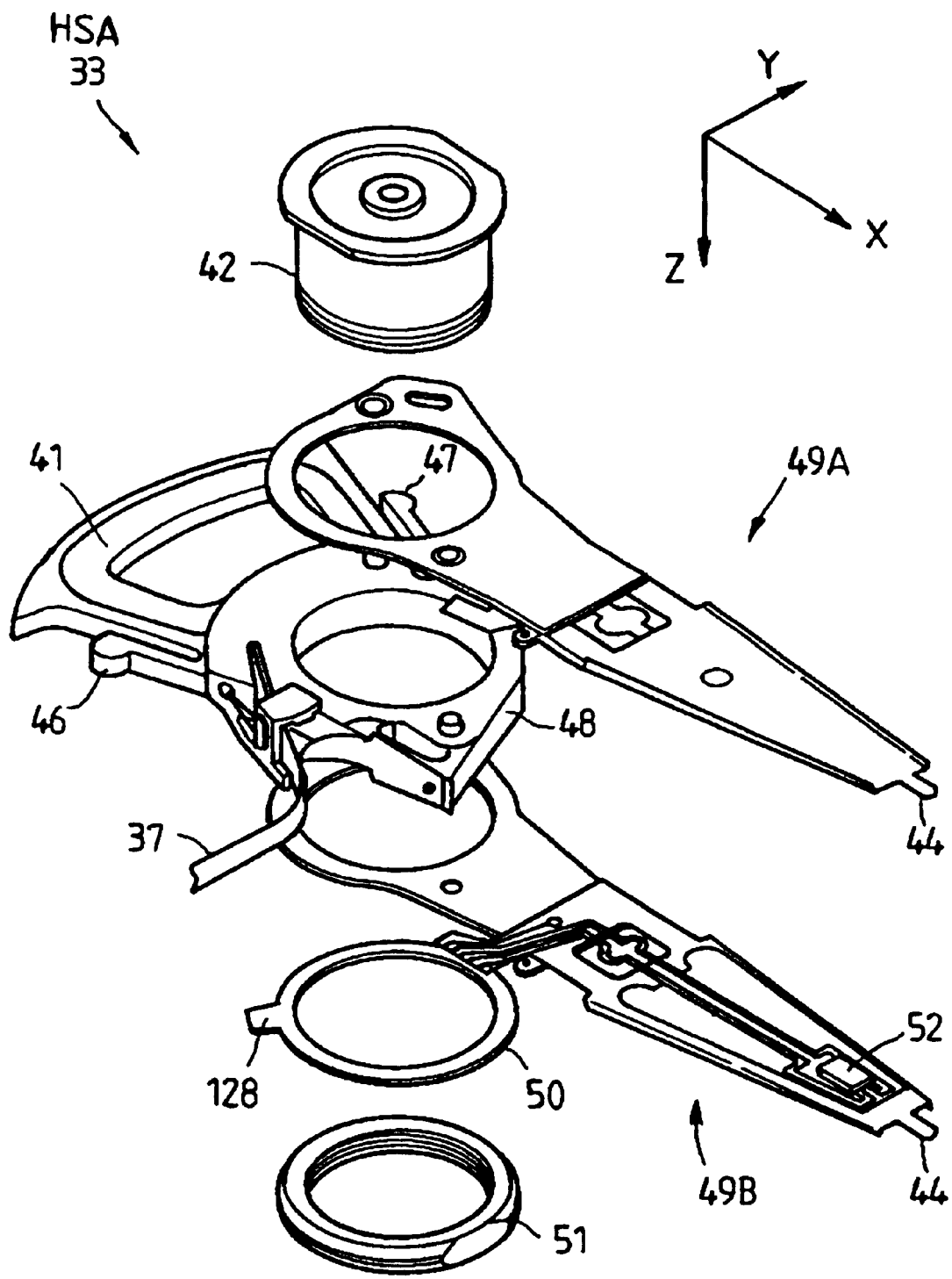
FIG. 4 is an exploded, isometric view of a head stack assembly for the device of FIG. 3.
Figure 6:
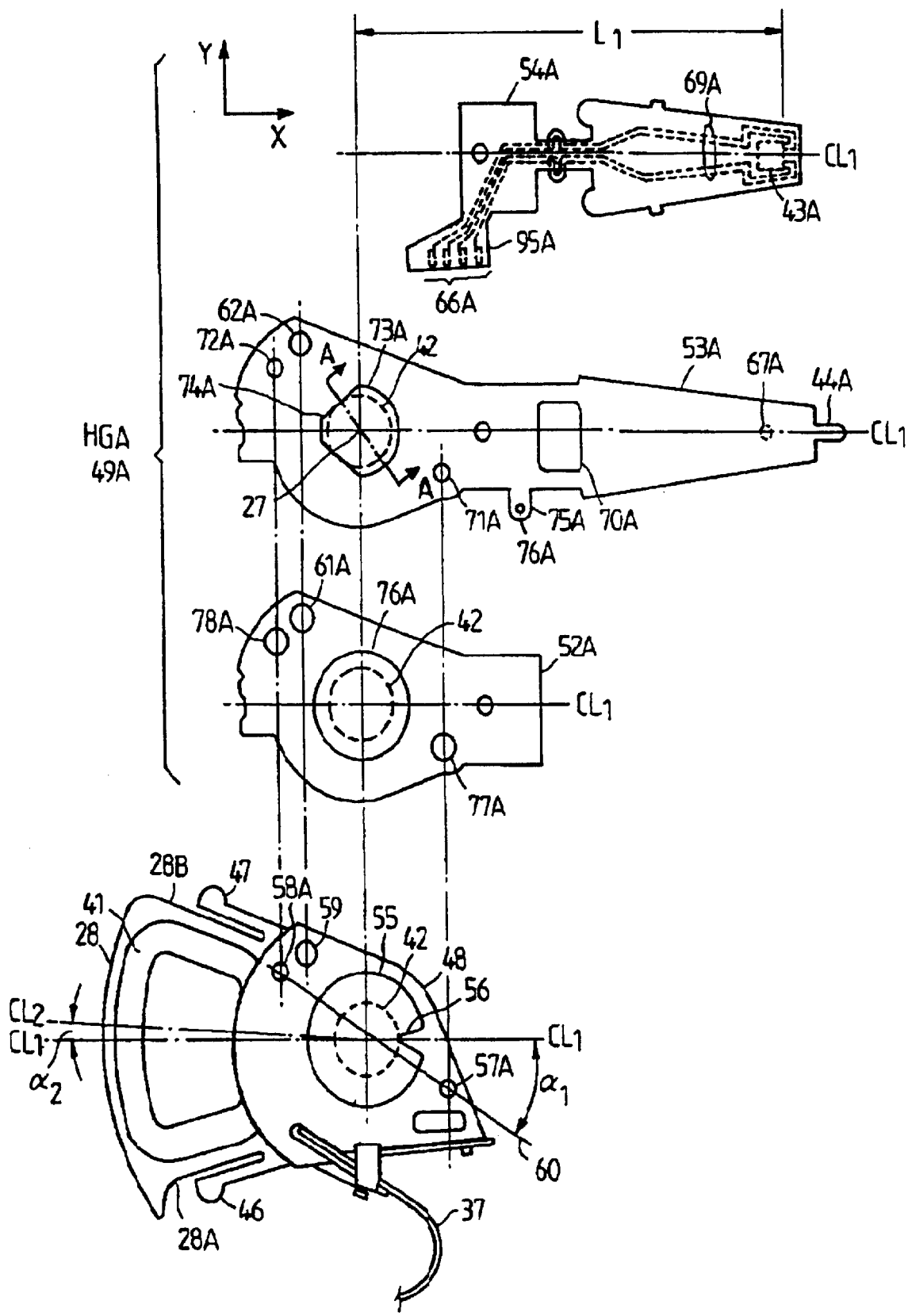
FIG. 6 is a plan view of the parts of the upper head gimbal assembly and the carriage of FIG. 5.

A first member 46 and a second member 47 are extended from a carriage 48 made of a plastic resin of the head stack assembly 33, as shown in FIGS. 4 and 6. The first member 46 engages with the inner crash stop 36 when the head of the head stack assembly 33 is positioned on the inner most data recording track of the hard disk 32. The second member 47 engages with the outer crash stop 35 when the front tab 44 of the head stack assembly 33 rest on the ramp element 45 and the head is positioned on a stand by position, i.e., the outermost position. The first and second members 46 and 47 has a flexibility since they are an elongated bar like member made of the plastic resin, so that the first and second members 46 and 47 operate as a damper absorbing a shock when the member 46 or 47 engages with the respective crash stop, whereby it is possible to use the inner and outer crash stops 36 and 35 made of the metal integrally made with the frame of the hard disk drive device 31. In this manner, the present invention solves the second problem described above.

Figure 10:
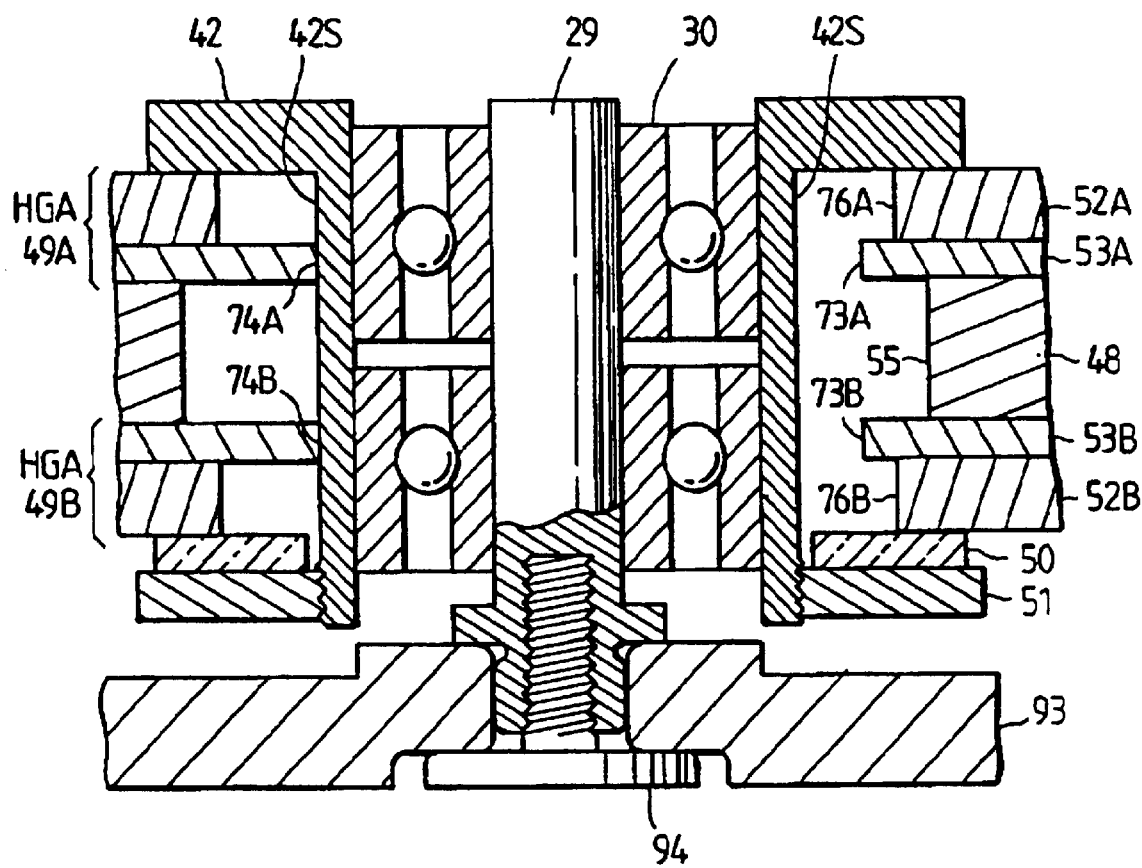
FIG. 10 is a sectional view of the head stack assembly of FIG. 4 and the frame of the hard disk drive device taken along the line A—A of FIGS. 5 and 6.

As described above, the 27 mm form factor represents the outer size of the housing 39, i.e., length L of 42.80 mm±0.10 mm, a width W of 36.40 mm±0.15 mm and a height of 5 mm (max). The hard disk 32 is supported by a shaft 40 which is rotated by a spindle motor, not shown. The head stack assembly 33 is pivotally moved around a pivot point or pivot carriage 42. The pivot carriage 42 includes bearing assemblies 30, as shown in FIG. 10. A voice coil 41 is mounted on the head stack assembly 33. The voice coil 41 and the magnet 34 constitute a voice coil motor. A current supplied to the voice coil 41 is controlled to move the head stack assembly 33 along a radial direction indicated by an arrow "A" (FIG. 3) of the hard disk 32 to position a head on a head slider assembly 43 on a data recording track on the hard disk 32 to read data from the data recording track or to write the data into the data recording track. It is noted that the head/slider assembly 43 is shown in an enlarged shape in FIG. 3. Electrical conductive wires on the flexible cable 37 connect the head and the voice coil 41 to the control unit 38.

FIG. 4 shows the various parts of the head stack assembly (HSA) 33 in accordance with the present invention. In the head stack assembly 33, a first head gimbal assembly 49A is mounted on an upper or a first surface of the carriage 48, and a second head gimbal assembly 49B is mounted on a lower or a second surface of the carriage 48. The data recording disk or the hard disk 32 is located between the head gimbal assembly 49A and the head gimbal assembly 49B. For simplicity, the hard disk 32 is not shown in FIG. 4. The flexible cable 37 is mounted on the side wall of the carriage 48. The head gimbal assembly 49A, the carriage 48 and the head gimbal assembly 49B are fixed by the pivot cartridge 42, a washer 50 and a nut 51.

Figure 5:
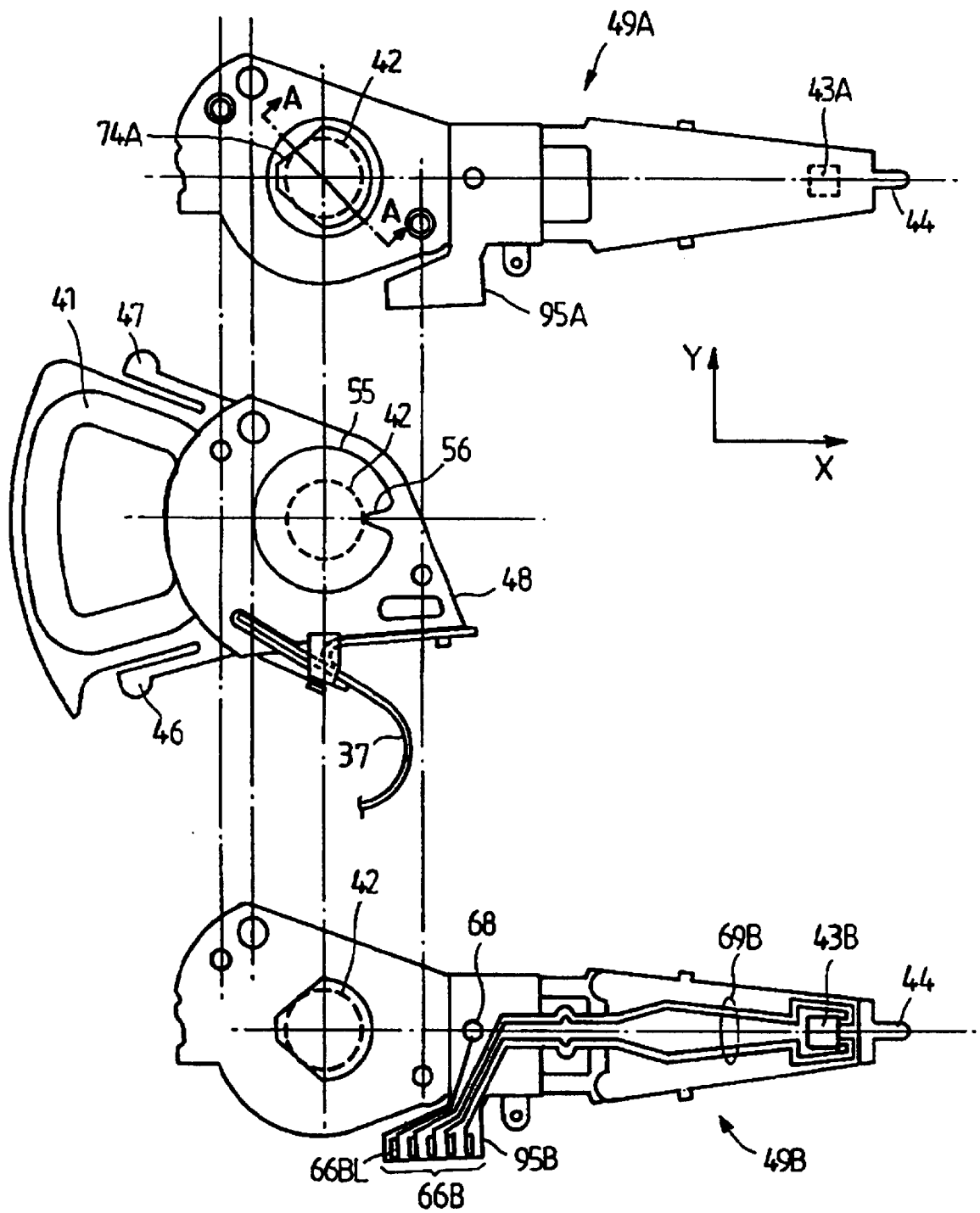
FIG. 5 is a plan view of several components of the head stack assembly of FIG. 4, including the upper and lower head gimbal assemblies and the carriage.

The head stack assembly 33 assembled by using an improved datum system, in accordance with the present invention, for precisely positioning the head gimbal assemblies 49A and 49B and the voice coil 41 to the carriage 48 is described with reference to FIGS. 5 and 6. FIG. 5 shows a plan view in a X-Y plane of the upper head gimbal assembly 49A, the carriage 48 and the lower head gimbal assembly 49B. FIG. 6 shows a plane view in the X-Y plane of the parts of the upper head gimbal assembly 49A and the carriage 48. Referring to FIG. 6, the upper head gimbal assembly (HGA) 49A includes an arm member 52A, a suspension load beam 53A and an integrated wiring plate 54A. A center line $CL_1$ extends in a longitudinal direction of the head stack assembly 33. An aperture 55, a center of which is aligned to the center line $CL_1$, is formed in the carriage 48. The dashed circle line 42 represents the outer surface of the pivot cartridge 42 shown in FIG. 4. An extended portion 56 of the carriage 48 is formed in the aperture 55. A front end of the extended portion 56 engages with the outer surface of the pivot cartridge 42 to guide the pivot cartridge 42 in a correct position, as described later, when the upper head gimbal assembly 49A, the carriage 48, the lower head gimbal assembly 49B and the pivot cartridge 42 are assembled, as shown in the FIGS. 5, 6 and 7.

In the following description, only the structure of the upper or first head gimbal assembly 49A is described, since the structure of the lower or second head gimbal assembly 49B is substantially the same as that of the assembly 49A. The same reference number is assigned to the same parts of the head gimbal assemblies 49A and 49B, wherein the character "A" after the reference number represents the part of the upper head gimbal assembly 49A and the character "B" after the reference number represents the part of the lower head gimbal assembly 49B.

The carriage 48 is made of plastic resin, such as polyester resin. The carriage 48 has the first element 46, the second element 47 and a frame portion 28 for supporting the voice coil 41. Since the first and second members 46 and 47 are extended from the plastic carriage 48 along a first side surface 28A and the second side surface 28B of the frame member 28 for supporting the voice coil 41 and have elongated shape, both the first and second members 46 and 47 have a resilience or the flexibility. Further, the carriage 48 is provided with the following datum features shown in the FIGS. 6 and 7.

Figure 7:
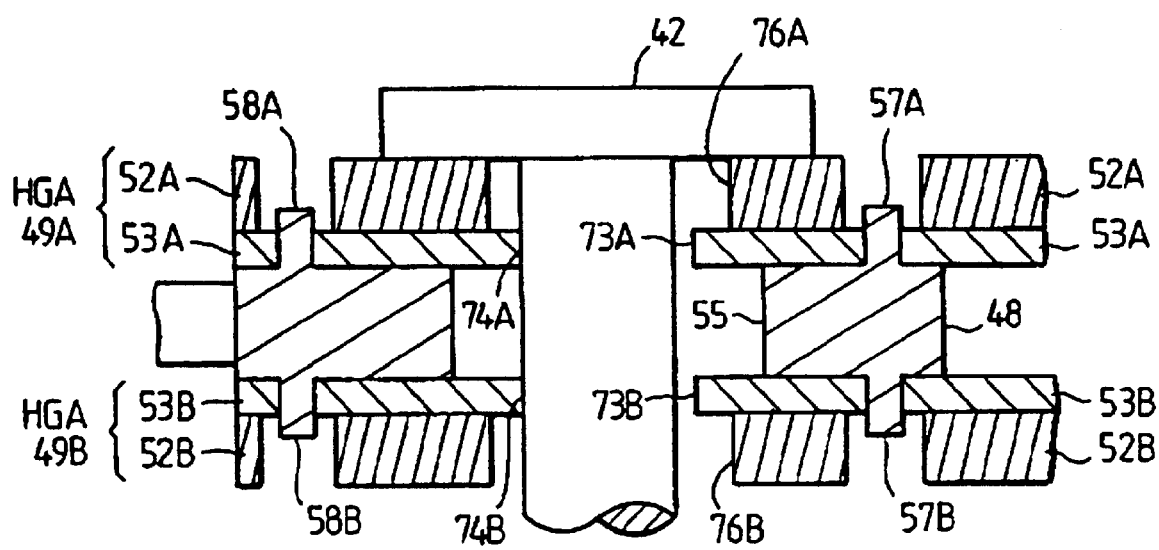
FIG. 7 is a sectional view of the head stack assembly of FIG. 4 taken along the line 60 of FIG. 6.

FIG. 7 shows a cross section of the head stack assembly 33 along a line 60 shown in FIG. 6. As shown in FIG. 7, a datum member, which includes (A) a datum pin or a datum member 57A operating as a first datum feature or a first datum point and (B) a datum pin or a datum member 58A operating as a second datum feature or a second datum point for aligning the upper head gimbal assembly 49A on the carriage 48, is formed on the first surface, i.e., the upper. surface, of the carriage 48, and a datum member, which includes (A) a datum pin or a datum member 57B operating as the first datum feature or the first datum point and (B) a datum pin or a datum member 58B operating as the second datum feature or the second datum point for aligning the lower head gimbal assembly 49B, is formed on the other surface, i.e., the lower surface, of the carriage 48. Further, the carriage 48 is formed with an aperture 59. The carriage 48 is fabricated by a molding process well known in the art.

The integrated wiring plate 54A is formed by three layers. The three layers are shown in FIG. 15. It is noted that FIG. 15 shows a particular structure of a portion 68, described later, of the lower head gimbal assembly 49B shown in FIG. 5, and at this point of time, FIG. 15 is referred to describe the three layers. As shown in FIG. 15, the three layers are a supporting layer 63 made of stainless steel, an insulating layer 64 made of polyimide and an electrically conductive layer 65 made of copper. A head/slider assembly 43A is mounted on a flexure, not shown, formed on the front portion of the integrated wiring plate 54A, and a dimple 67A is formed on a surface of the suspension load beam 53A to face to the flexure which supports a head/slider assembly 43A. The dimple 67A supports the center of the back side surface of the flexure, so that the flexure and the head/slider assembly 43A can perform a gimbal type motion, as well known in the art. The read/write head, not shown, such as MR (magneto resistive) merged head, is attached on a front side of the head/slider assembly 43A near to the front tab 44A. The MR-merged head contains a read element, a write element and four connecting pads, not shown. A first pair comprising two connecting pads is connected to the read element, and a second pair comprising the remaining two connecting pads is connected to the write element. Therefore, four connecting wires 69A and four connecting pads 66A are formed on the integrated wiring plate 54A by etching the upper most copper layer 65 (FIG. 15). An extended plate 95A cantilevers from one side edge of the integrated wiring plate 54A. The connecting pads 66A and the wires for connecting the pads 66A and the MR merged head are formed on the extended plate 95A. Since the three layers of the integrated wiring plate 54A is flexible, the extended plate 95A can flex in the Z direction. The center of the read/write head is aligned to the center line $CL_1$ of the integrated wiring plate 54A. The connection of the pads 66A to the flexible cable 37 is later described with reference to FIG. 14.

The integrated wiring plate 54A is fixed on the suspension load beam 53A to precisely align the center line $CL_1$ of the integrated wiring plate 54A to the center line $CL_1$ of the load beam 53A and to precisely keep a distance between the center of the pivot cartridge 42 and the MR head to a designed value $L_1$, when the three parts, i.e., the integrated wiring plate 54A, the suspension load beam 53A and the arm member 52A are assembled.

The suspension load beam 53A is made of resilient stainless steel. The suspension load beam 53A includes a rear portion, a bending portion defined by an aperture 70A and a front portion supporting a head/slider assembly 43A. Two apertures 71A and 72A, into which the datum pins 57A and 58A are inserted, respectively, are formed in the positions on the suspension load beam 53A to precisely align the center line $CL_1$ of the suspension load beam 53A to the center line $CL_1$ of the carriage 48 and to precisely keep the distance between the center of the first aperture 55 of the carriage 48 and the MR head on the integrated wiring plate 54A to the designed value $L_1$. A second aperture or a datum aperture 73A for precisely align the center of the pivot cartridge 42 to the center of the aperture 55 of the carriage 48, i.e., the pivot point of the head stack assembly 33 is formed on the suspension load beam 53A. The center of the aperture 73A is aligned to the center of the first aperture 55. The diameter of the aperture 73A is larger than the diameter of the pivot cartridge 42. The aperture 73A includes a V-shaped edge 74A and a semicircular portion, the diameter of which is larger than the diameter of the pivot cartridge 42. An aperture 62A is formed on the suspension load beam 53A. The aperture 62A is formed to align to the aperture 59 on the carriage 48 when the datum pins 57A and 58A are fitted into the datum apertures 71A and 72A, respectively. An extended portion 75A is formed on one side edge of the suspension load beam 53A, and an aperture 76A is formed on the portion 75A. The diameter of the first aperture 55 is larger than the diameter of the pivot member or the pivot cartridge 42. The purpose for providing the extended portion 75A and the aperture 76A is later described with reference to FIGS. 8(A) and 8(B).

The arm member 52A is made of stainless steel, and the thickness of the arm member 52A is thicker than the thickness of the suspension load beam 53A. An aperture 76A, diameter of which is larger than the diameter of the pivot cartridge 42, is formed on the arm member 52A. Two apertures 77A and 78A, the diameter of which are larger than the diameter of the datum apertures 71A and 72A are formed on the arm member 52A. The center of the apertures 77A and 78A are aligned to the center of the datum apertures 71A and 72A, respectively. The aperture 61A is formed to align to the aperture 59 on the carriage 48 when the arm member 52A is assembled on the suspension load beam 53A.

In the following description, only the datum system for aligning the upper head gimbal assembly 49A is described for simplifying the description. And, the description about the datum system for the upper head gimbal assembly 49A is applicable to the lower head gimbal assembly 49B.

It is noted that the present invention relates to the datum system for precisely aligning the head gimbal assemblies 49A and 49B, which are assembled in advance, and the voice coil 41 to the carriage 48. Therefore, it is assumed that the three parts, i.e., the integrated wiring plate 54A, the suspension load beam 53A and the arm member 52A have been assembled, in advance to form the head gimbal assembly 49A. In the assembled state, (a) the center lines $CL_1$ of all the three parts 52A, 53A and 54A are aligned to each other and (b) the distance between the center 27 of the aperture 73A, which is later aligned to the center of the pivot cartridge 42, and the MR merged head is a designed value.

The first datum pin 57A, the second datum pin 58A and the aperture 55 are so formed on the carriage 48 that the aperture 55, through which the pivot cartridge 42 is located, is located between the first datum pin 57A and the second datum pin 58A, as shown in FIG. 6. And, the line 60 passing through the centers of the first and second datum pins 57A and 58A is inclined from the center line CL1 of the head stack assembly 33 by an angle α1 as shown in FIG. 6. In other words, the center line CL1 is defined by shifting or rotating the line 60 by the angle α1 in a counter clockwise direction.

Figure 14:
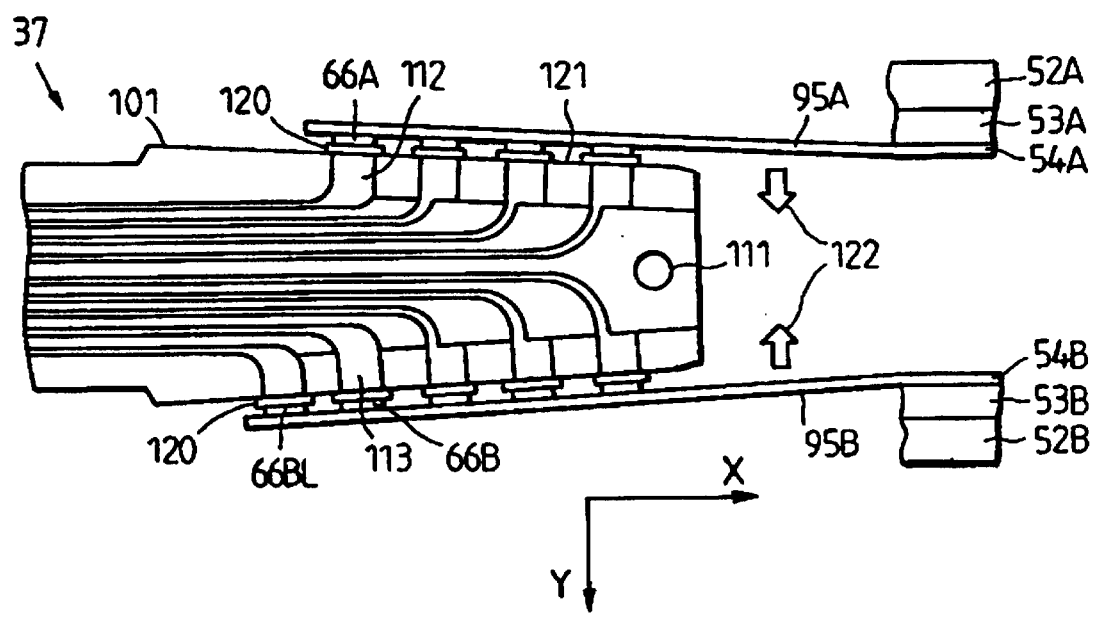
FIG. 14 is a plan view of the head gimbal assemblies of FIG. 5 illustrating the connection of their respective connecting pads to the flexible cable of FIG. 11.
Figure 15:
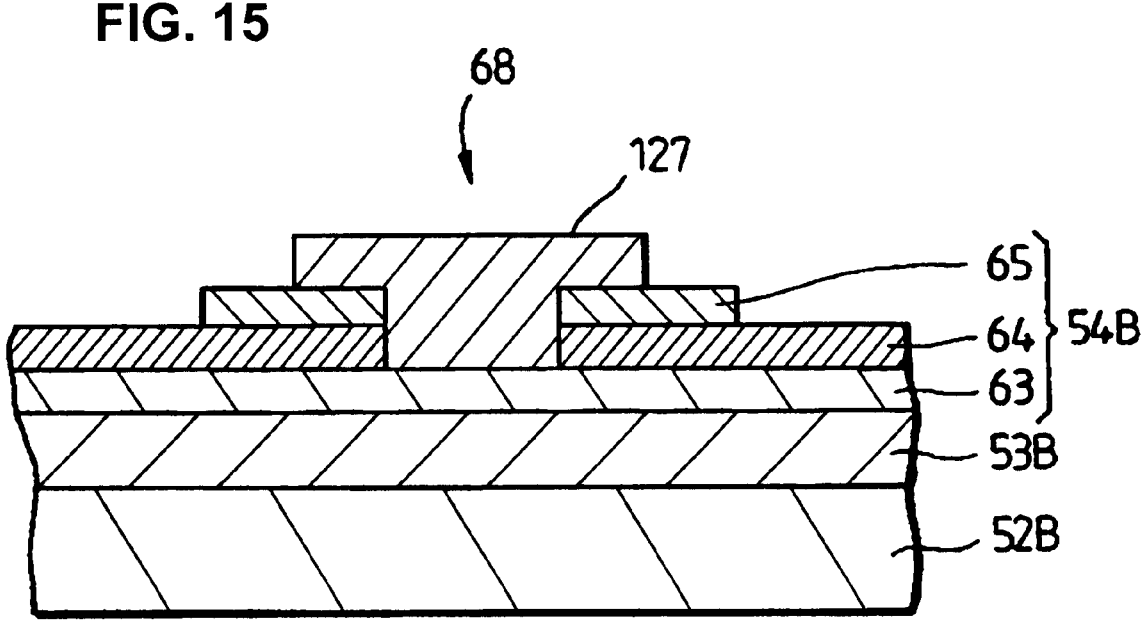
FIG. 15 is a sectional view of a portion of the assembly of FIG. 5.

Since the total weight of the completed head stack assembly (HSA) 33 of the present invention is balanced at the rotating center of the pivot cartridge 42 which is located on the center line $CL_1$, the total weight is described. The total weight of the head stack assembly 33 is a sum of:

(A) the weight of the carriage 48;

(B) the weight of a portion 119 (FIG. 11) of the flexible cable 37;

(C) the weight of solder for bonding the connecting pads 66A and 66B to the connecting pads 112 and 113 of the flexible cable 37 (FIG. 14);

(D) the weight of the head gimbal assemblies 49A and 49B, wherein the assemblies 49A and 49B have the same structure and weight, and one of the assemblies, for example the assembly 49A, includes the arm member 52A, the suspension load beam 53A and the integrated wiring plate 54A; and (E) the weight of the voice coil 41.

The voice coil 41 is inserted into the space defined by the frame portion 28. The center line of the voice coil 41 is represented by the line $CL_2$. The total weight of the voice coil 41 is balanced at the center line $CL_2$. The center line $CL_2$ of the voice coil 41 is shifted from the center line $CL_1$ of the carriage 48 by an angle $α_2$ to balance the total weight of the completed head stack assembly 33 at the rotating center of the pivot cartridge 42 which is located on the center line $CL_1$.

As described above, the two apertures 71A and 72A, into which the datum pins 57A and 58A are inserted, respectively, are formed on the suspension load beam 53A. It is noted that these two apertures 71A and 72A on the suspension load beam 53A are used to align the head gimbal assembly 49A to the carriage 48. More particularly, the diameter of the apertures 77A and 78A on the arm member 52A is larger than the diameter of the datum pins 57A and 58A, so that the datum pins 57A and 58A engage with the apertures 71A and 72A of the suspension load beam 53A, respectively, as shown in FIG. 7. In this manner, the center line $CL_1$ of the head gimbal assembly 49A, to which the center of the read/write head is aligned to the center line $CL_1$ of the carriage 48.

Figure 8A:
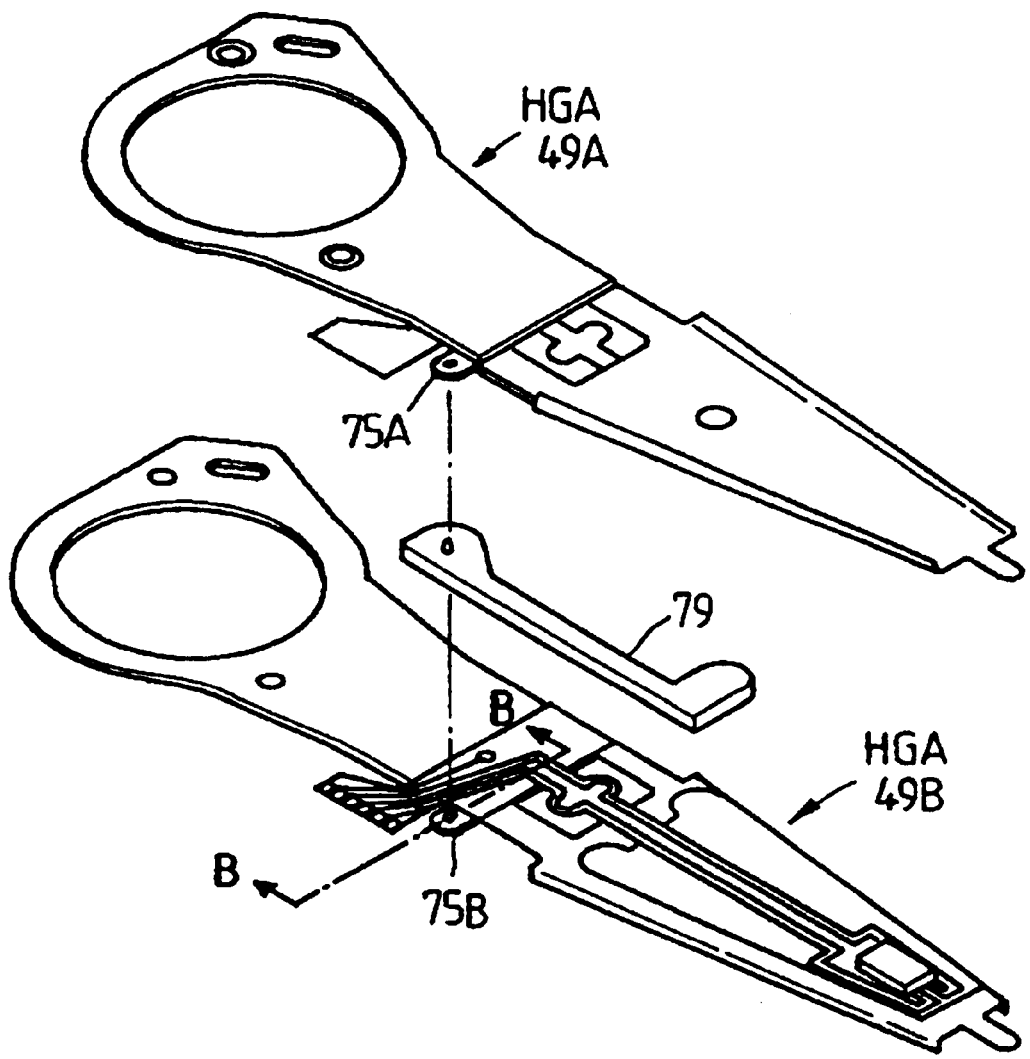
FIG. 8(A) is an exploded, isometric view of a separator inserted between the upper and lower head gimbal assemblies of FIG. 5.
Figure 8B:
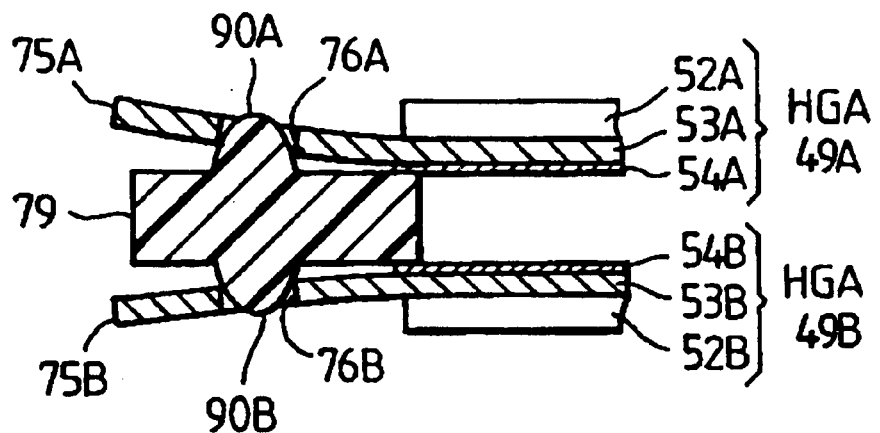
FIG. 8(B) is a sectional view of the assembly of FIG. 8(A) taken along the line B—B of FIG. 8(A).

FIG. 8(A) shows a separator 79 inserted between the head gimbal assembly 49A and the head gimbal assembly 49B. When both the head gimbal assemblies 49A and 49B are mounted on the upper surface and the lower surface of the carriage 48, respectively, as shown in FIG. 7, the separator 79 having two extruded portions 90A and 90B formed is inserted between the extended portion 75A of the suspension load beam 53A and the extended portion 75B of the suspension load beam 53B to prevent the two MR heads supported on the head gimbal assemblies 49A and 49B from colliding each other during the assembling process of the head gimbal assemblies 49A and 49B on the carriage 48, as shown in FIGS. 8(A) and 8(B). The aperture 76A of the extended portion 75A engages with the extruded portion 90A, and the aperture 76B of the extended portion 75B of the suspension load beam 53B engages with the extruded portion 90B.

Figure 9A:
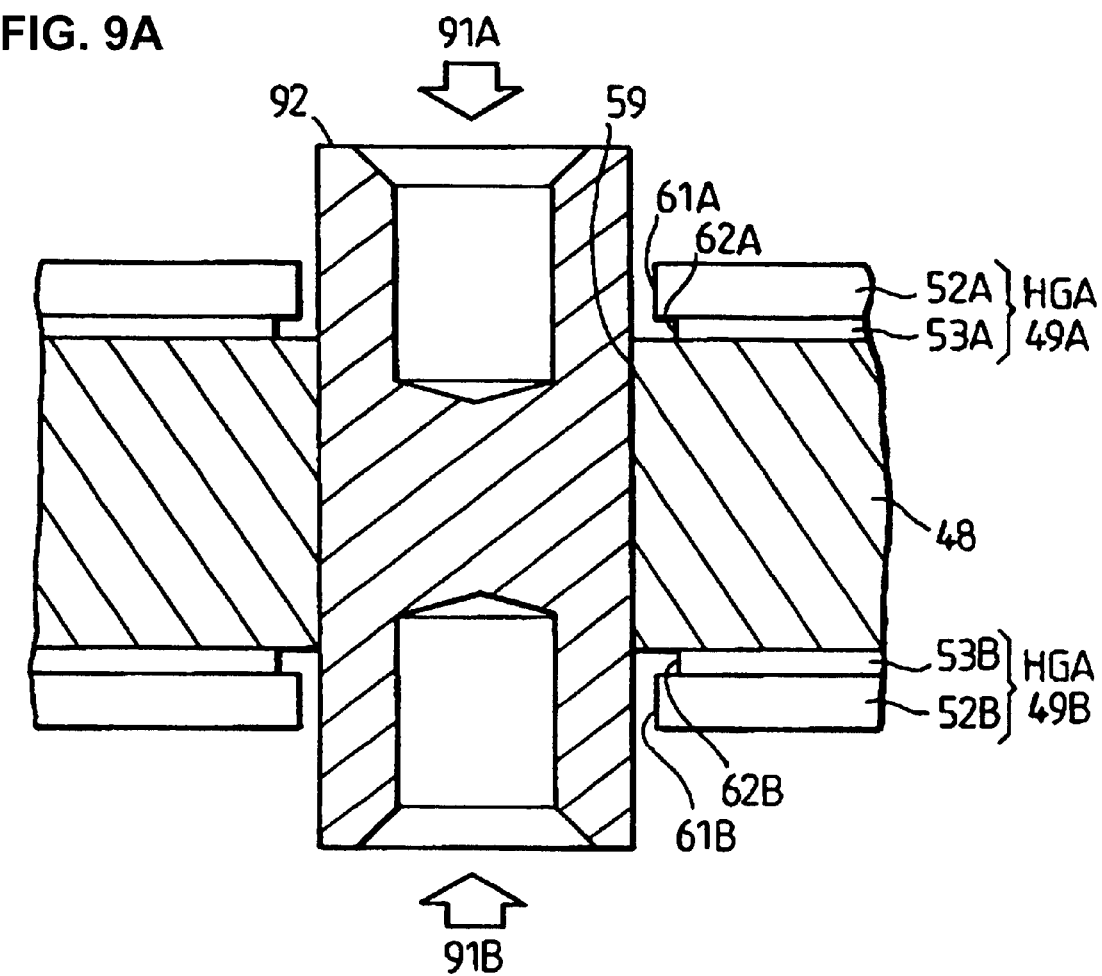
FIG. 9(A) is a schematic sectional view of the head gimbal assemblies and carriage of FIG. 5 shown prior to tacking.
Figure 9B:
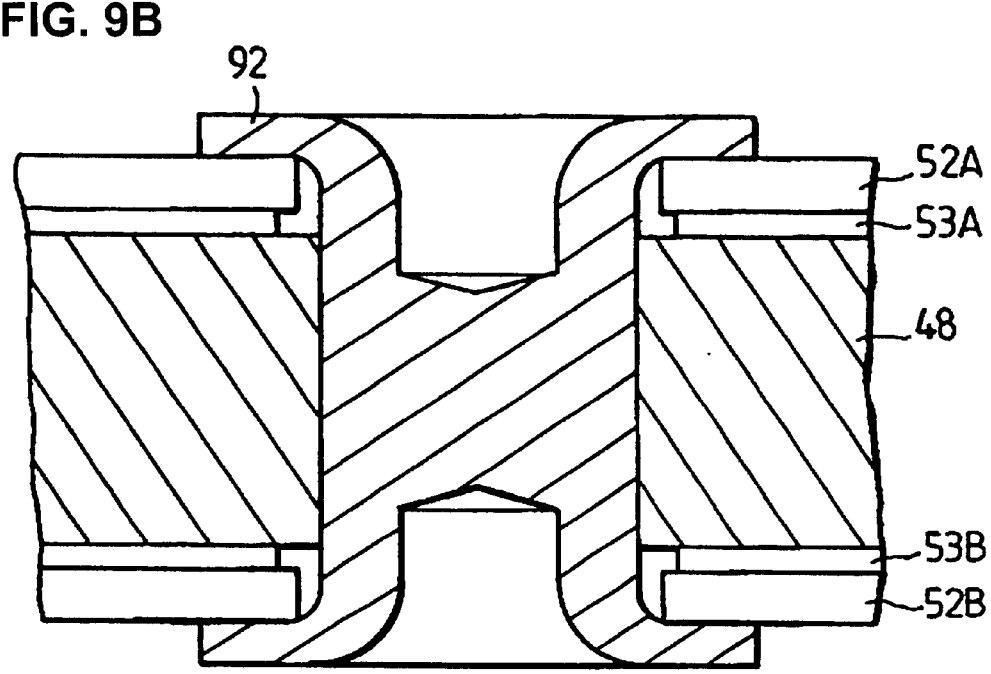
FIG. 9(B) is a schematic sectional view of the head gimbal assemblies and carriage of FIG. 9(A) shown after tacking.

FIGS. 9(A) and 9(B) shows the tacking operation of the head gimbal assemblies (HGA) 49A and 49B on the carriage 48. The tacking operation is performed before the insertion of the pivot cartridge 42. A tacking pin 92 made of plastic resin is inserted through the aperture 61A of the arm member 52A, the aperture 62A of the suspension load beam 53A, the aperture 59 of the carriage 48, the aperture 62B of the suspension load beam 53B and the aperture 61B of the arm member 52B, as shown in FIG. 9(A). Next, the top portion and the bottom portion of the tacking pin 92 is pressed by the force and heat applied in the direction of arrows 91A and 91B, so that the head gimbal assemblies 49A and 49B are tacked to the carriage 48, as shown in FIG. 9(B).

After that the head gimbal assemblies 49A and 49B are tacked on the carriage 48, the pivot cartridge 42 is inserted through the aperture 76A of the arm member 52A, the aperture 73A of the suspension load beam 53A, the aperture 55 of the carriage 48, the aperture 73B of the suspension load beam 53B and the aperture 76B of the arm member 52B, as shown in FIG. 7. The V-shaped edge 74A and 74B of the apertures 73A and 73B of the suspension load beams 53A and 53B and the extruded portion 56 of the carriage 48 are used as the datum points for aligning the center of the pivot cartridge 42 to the pivot point of the head stack assembly 33 on the center line $CL_1$. Next, the alignment of the center of the pivot cartridge 42 to the pivot point of the head stack assembly 33 is described with reference to the FIGS. 5, 6 and 10.

FIG. 10 shows the cross section of the head stack assembly 33 and the frame 93 of the hard disk drive device 31 along a line A—A shown in the FIGS. 5 and 6. The extruded portion 56 of the carriage 48 has the flexibility since it is made of the plastic resin. And, the size of the extended portion 56 is so designed that the extended portion 56 deforms and pushes the pivot cartridge 42 to the V-shaped edge 74A when the extended portion 56 engages with the outer surface of the pivot cartridge 42. Therefore, when the pivot cartridge 42 is inserted, the extruded portion 56 of the carriage 48 pushes the side wall of the pivot cartridge 42 to the V-shaped edges 74A and 74B of the apertures 73A and 73B, as apparent from the FIGS. 5 and 6, so that the pivot cartridge 42 is aligned to the V-shaped edge 74A and 74B which are the datum points. In this manner, the pivot cartridge 42 is supported by only five supporting points, i.e., the two supporting points on the V-shaped edge 74A of the head gimbal assembly 49A, one supporting point on the extruded portion 56 of the carriage 48 and the two supporting points on the V-shaped edge 74B of the head gimbal assembly 49B, whereby (1) the center lines $CL_1$ of the head gimbal assemblies 49A and 49B are aligned to the center of the pivot cartridge 42, and (2) the distance between the center of the pivot cartridge 42 and the MR head is the designed value $L_1$. The pivot cartridge 42 includes a stud 29 which is fixed to the frame 93 by a screw 94, the outer surface portion 42S and bearing units 30 mounted between the stud 29 and the outer surface portion 42S.

The reason for forming the datum apertures 71A and 72A and the datum aperture 73A on the suspension load beam 53A is that the distance between the center 27 of the aperture 73A (i.e., the rotating center of the pivot cartridge 42) and the MR head has been defined as the designed value $L_1$, and the center of the MR head has been aligned to the center line $CL_1$ of the suspension load beam 53A.

Figure 11:
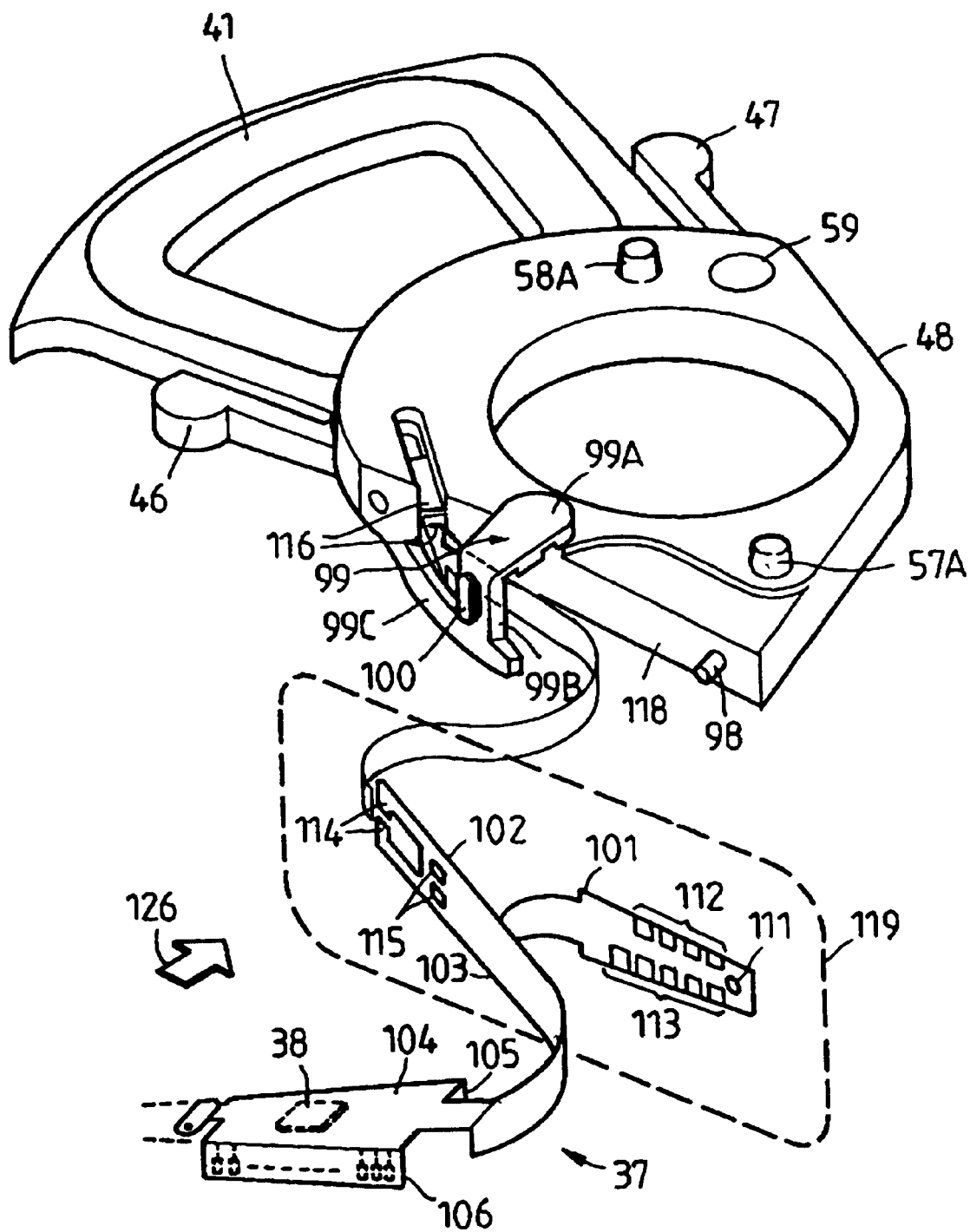
FIG. 11 is an isometric view of the carriage of FIG. 5 with a flexible cable mounted thereto.
Figure 12:
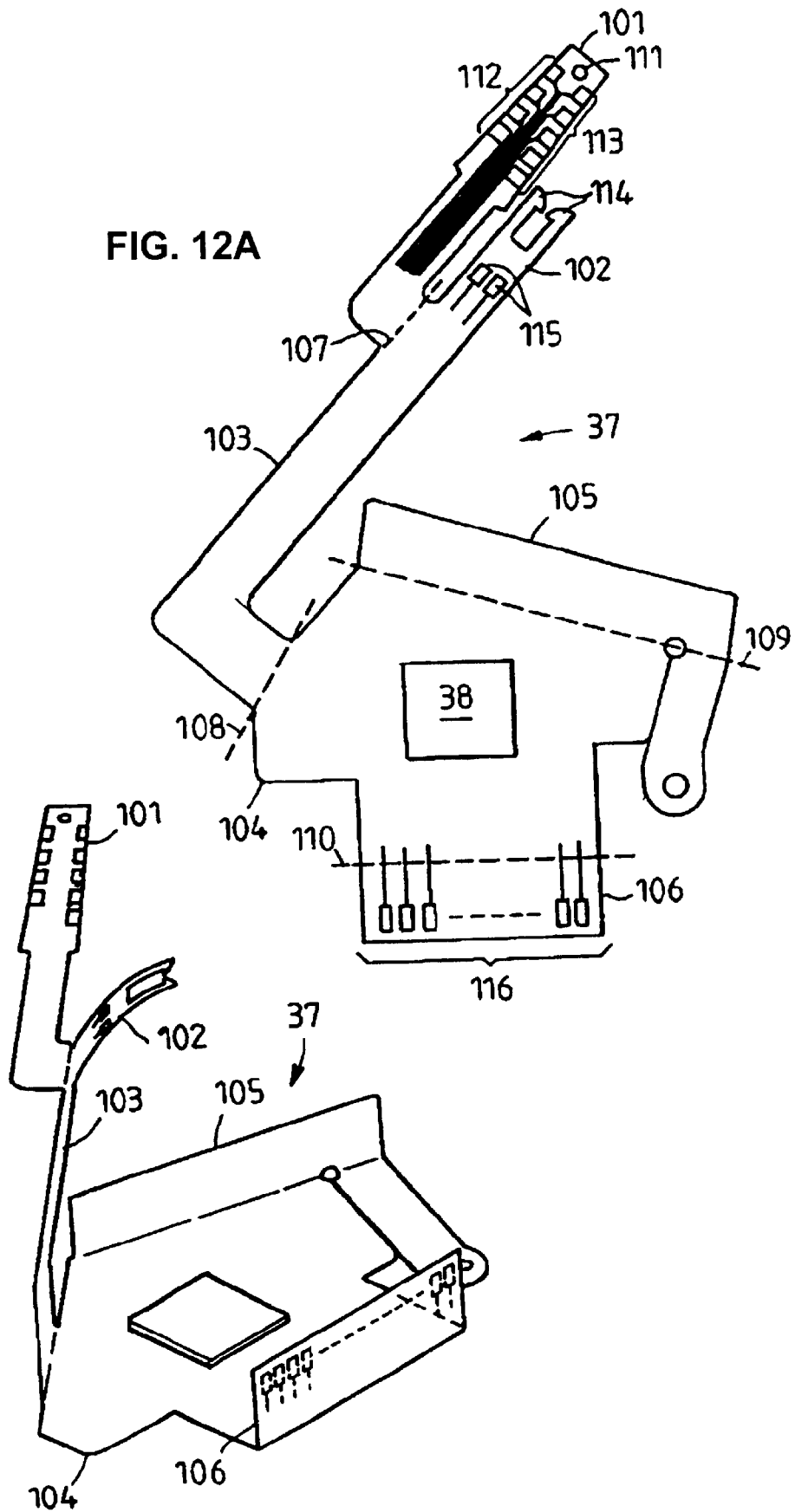
FIG. 12(A) is a plan view of the flexible cable of FIG. 11.
FIG. 12(B) is an alternate isometric view of the flexible cable of FIG. 11.
Figure 13:
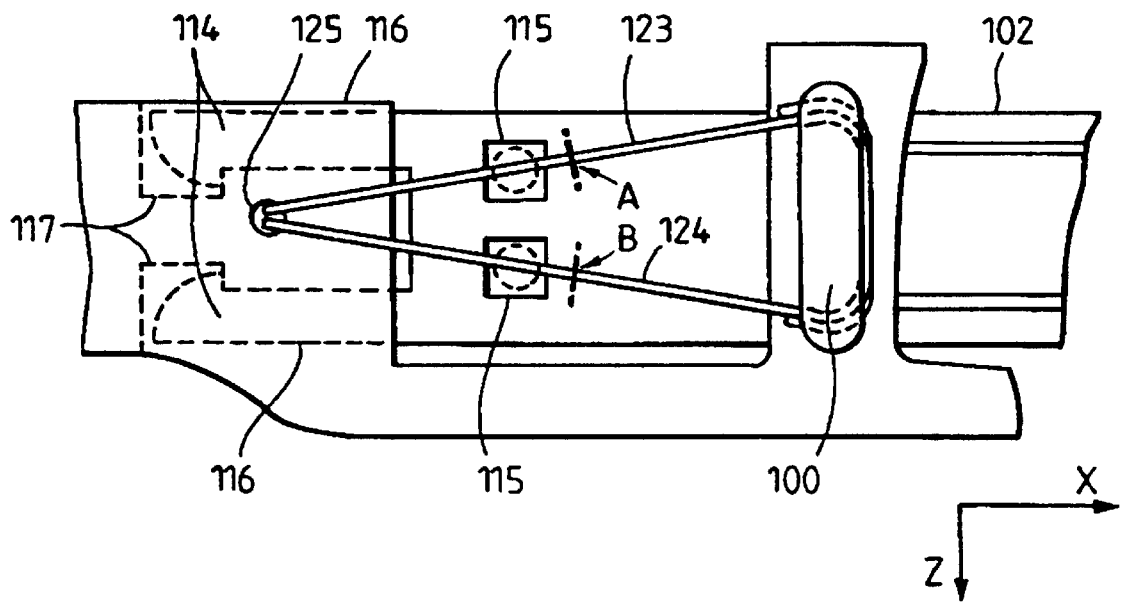
FIG. 13 is a plan view of the flexible cable of FIG. 11 illustrating the connection of wires of a voice coil to the connecting pads on the flexible cable.

The connection of the flexible cable 37 to the carriage 48 is described with reference to FIGS. 11, 12, 13 and 14. FIG. 11 shows the mount of the flexible cable 37 to the carriage 48. FIGS. 12(A) and 12(B) show the structure of the flexible cable 37. FIG. 13 shows the connection of wires of the voice coil 41 to the connecting pads on the flexible cable 37. FIG. 14 shows the connection of the connecting pads 66A of the upper head gimbal assembly 49A shown in FIG. 6 and the connecting pads 66B of the lower head gimbal assembly 49B shown in FIG. 5 to the connecting pads 112 and 113 on the flexible cable 37.

A plan view of the flexible cable 37 is shown in FIG. 12(A). The flexible cable 37 is constituted by a first portion 101, a second portion 102, a third portion 103, a fourth portion 104, a fifth portion 105 and a sixth portion 106, as shown in the FIGS. 11 and 12.

A positioning aperture 111, into which a positioning pin 98 on the carriage 48 is inserted, is formed on a front portion of the first portion 101. Four connecting pads 112, which are connected to the four connecting pads 66A of the upper head gimbal assembly 49A shown in FIG. 6 by a soldering process, and five connecting pads 113, which are connected to the five connecting pads 66B of the lower head gimbal assembly 49B shown in FIG. 5 by the soldering process are formed on both the edges of the first portion 101.

A latch portion or a latch structure 114 is formed on the front end of the second portion 102. Two connecting pads 115 are formed on the second portion 102. The electrically conductive connection wires are formed on the first, second, third and fourth portions 101, 102, 103 and 104 to connect the pads 112, 113 and 115 to the control unit 38 mounted on the surface of the fourth portion 104. For simplifying the drawing, a portion of the connection wires is shown in FIG. 12.

The connecting pads 116 are formed on the surface of the sixth portion 106 to connect the control unit 38 to a control card, not shown, mounted within the housing 39 of the hard disk drive device 31. Each of the portions of the flexible cable 37 shown in FIG. 12(A) is folded along dashed lines 107, 108, 109 and 110 to form the structure shown in FIG. 12(B). That is, the first portion 101 is folded by 180 degrees to cause the back surface of the first portion 101 to touch the back surface of the second portion 102. The folded flexible cable 37 is positioned with respect to the carriage 48, as shown in FIG. 11.

The positioning pin 98 is formed on a side wall 118 which is vertical to the upper surface of the carriage 48. A guide member 99 is integrally formed on the carriage 48. The guide member 99 includes a top portion 99A parallel to the surface of the carriage 48 and having one end coupled to the carriage and the other end, a side portion 99B parallel to the side wall 118 and having one end coupled to the other end of the top portion 99A and a support portion 99C between the other end of the side portion 99B and the carriage 48. A wire positioning pin 100 is formed on the outer surface of the side portion 99B. Two grooves 116 extending from the surface of the side wall 118 to the inside of the carriage 48 are formed on the carriage 48, and a recess 117 is formed in each of the grooves 116, as shown in the FIGS. 11 and 13. The second portion 102 of the flexible cable 37 is inserted into the grooves 116 through the guide member 99 until the latch portion 114 engages with the recesses 117 in the grooves 116, as shown in FIG. 13. The first portion 101 of the flexible cable 37 is positioned to extend along the side wall 118 of the carriage 48, and the positioning pin 98 is inserted into the positioning aperture 111. In this manner the first portion 101 and the second portion 102 are positioned between the side wall 118 and the side portion 99B, so that the flexible cable 37 is automatically fixed to the carriage 48. This automatic engagement of the flexible cable 37 to the carriage 48 solves the third problem described above.

As shown in FIG. 13, two electrically conductive wires 123 and 124 of the voice coil 41 are extended through a hole 125 on the side wall of the carriage 48. Front ends of the wires 123 and 124 are wrapped around the wire positioning pin 100, so that the two wires 123 and 124 are positioned on the connecting pads 115, respectively on the second portion 102 of the flexible cable 37. The plane of the second portion 102 is in the X-Z plane. And, the wires 123 and 124 are bonded on the connecting pads 115, respectively. The wires 123 and 124 are cut at portions A and B, and the cut portions are removed.

FIG. 14 shows the first portion 101 of the flexible cable 37 in the X-Z plane and the two extended plates 95A and 95B in the X-Y plane, viewed in a direction of an arrow 126 in FIG. 11. It is noted that each of the connecting pads 66A and 66B on the extended plates 95A and 95B are plated with solder 120, and before the stack of the head gimbal assemblies 49A and 49B on the carriage 48, the flexible cable 37 is attached on the side wall of the carriage 48. When the head gimbal assemblies 49A and 49B are positioned on the carriage 48 by using the datum system described above, the connecting pads 112 and 113 of the first portion 101 can precisely contact the solders pads 120 on the connecting pads 66A and 66B due to the movement of the extended plates 95A and 95B in the direction shown by arrows 122 based upon their compliance or flexibility. In this state, the head gimbal assemblies 49A and 49B are tacked on the carriage 48 by the tacking operation as described with respect to FIG. 9.

Next, the solder pads 120 are reflowed to connect the connecting pads 66A to the connecting pads 112 and to connect the connecting pads 66B to the connecting pads 113, so that the MR heads on the head gimbal assemblies 49A and 49B are connected to the control unit 38 through the connecting wires on the integrated wiring plates 54A and 54B and the flexible cable 37. It is noted that the five connecting pads 66B including the left most pad 66BL are formed on the lower edge of the first portion 101. The pad 66BL is described below.

It is noted that the five connecting pads 66B are formed on the extended plate 95B of the lower head gimbal assembly 49B faced to one data recording surface of the hard disk, as shown in FIG. 5, while the four connecting pads 66A are formed on the extended plate 95A of the upper head gimbal assembly 49A faced to the other data recording surface of the hard disk, as shown in FIG. 6. One of the connecting pad, i.e., the pad 66BL, of the pads 66B on the extended plate 95B is connected to the mechanical parts included in the hard disk drive device 31 through the portion 69 shown in FIG. 5.

FIG. 15 shows the cross section of the structure of the portion 68 shown in FIG. 5. As described above, each of the integrated wiring plate 49A and 49B includes the three layers, i.e., the electrically conductive supporting layer 63 made of stainless steel, the insulating layer 64 made of polyimide and the electrically conductive layer 65 made of copper. The electrically conductive supporting layer 63 is electrically connected to the suspension load beam 53B and the arm member 52B. The suspension load beam 53B is electrically connected to the suspension load beam 53A through the pivot cartridge 42 made of electrically conductive material, as shown in FIG. 7. The electrically conductive pivot cartridge 42 is mounted on the electrically conductive frame member 93, as shown in FIG. 10.

Referring to FIG. 15 again, at the portion 68, the copper layer 65 and the insulating layer 64 are removed to form a recess for exposing the supporting layer 63, and an electrically conductive material 127, such as silver, is deposited into the recess and the surface of the copper layer 65. Since the copper layer 65 extends to the connecting pad 66BL, as shown in FIG. 5, all the electrically conductive mechanical parts of the hard disk drive device 31 are connected to the reference potential of the electrical circuit to prevent an ESD (Electro Static Discharge) effect. The ESD effect means that if the mechanical parts are electrically floating from the reference potential of the circuit, electrostatic charges accumulate on the mechanical parts, and the MR heads are damaged by the discharge of the accumulated electrostatic charges.

Figure 16:
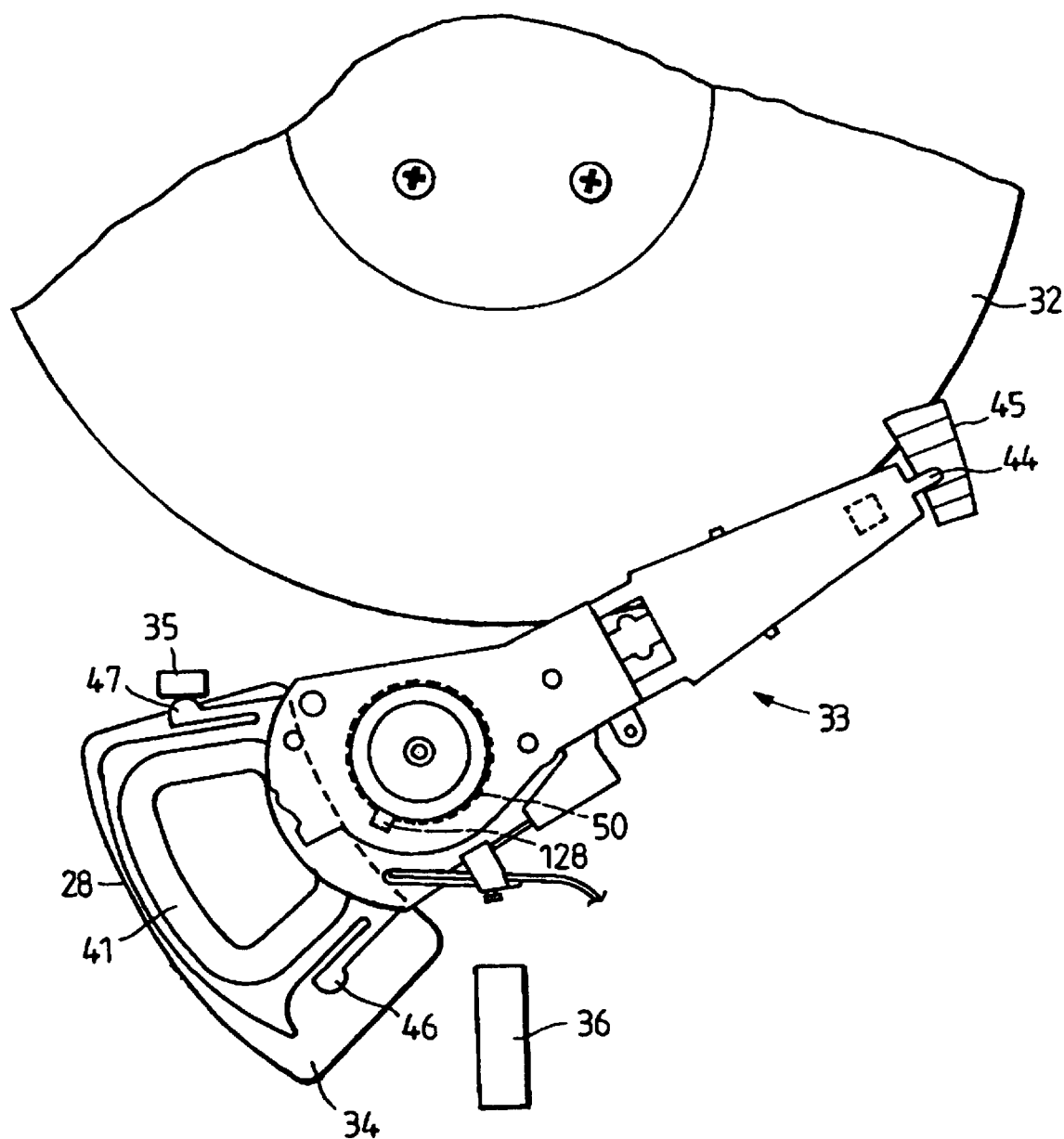
FIG. 16 is a plan view of the disk drive device of FIG. 3 in operation.

FIG. 16 shows the operation of the washer 50. The washer 50 has a tab or portion 128 extended from the peripheral of the washer. At least the tab portion 128 is made of a magnetic material, but both the washer 50 and the extended portion 128 can be made of the magnetic material. The washer 50 is fixed to the bottom surface of the arm member 52B of the lower head gimbal assembly 49B by the nut 51, as shown in FIG. 10, so that the extended or tab portion 128 is moved along with the head stack assembly 33. When the head stack assembly 33 is moved to the outer most stand by position on the ramp element 45 by the voice coil motor (VCM), which is constituted by the voice coil 41 and the magnet 34 fixed on the frame, the tab portion 128 of the magnetic material is positioned to the nearest position to the magnet 34, and is attracted by a leakage magnetic field of the magnet 34, and the magnet 34 and the tab portion 128 generates the bias force for staying the head stack assembly 33 at the outer most stop position.

As well known in the art, when the power of the hard disk drive device is turned off, the head stack assembly 33 is automatically returned to the outer most stand by position on the ramp element 45 by the following automatic unload circuit. The term "unload" means the movement of the head stack assembly from the position on the hard disk to the stand by position on the ramp element. The automatic unload circuit includes a capacitor having a first terminal connected to the power supply and a second terminal connected to the reference potential, and a switching circuit connected between the first terminal of the capacitor and one terminal of the voice coil 41. When the power is turned on, the switching circuit is turned off, and the capacitor is charged. When the power is turned off, the switching circuit is turned on, and the charges stored in the capacitor is supplied to the voice coil 41 to move the head stack assembly toward the stand by position. The bias force generated by the tab portion 128 and the magnet 34 of the present invention causes the head stack assembly to stay at the stand by position after the turn off of the power.

The diameter of the wire of the voice coil 41 of the present invention can be very small, such as 73 $\mu$m, to realize the resistivity of the wire equal to or larger than 14 ohms, so that a time constant of the coil 41 is sufficiently long to continuously flow the current during the turn off of the power, whereby the unload operation with a high reliability can be performed.

As stated above, the bias force causes the MR head to stay at the outer most stand by position when the power of the hard disk drive device is turned off. The attraction force applied to the tab portion 128 by the magnet 34 is sufficiently keep the head stack assembly 33 at the stand by position during the turn off of the power, but is smaller than the driving force of the VCM for positioning the MR heads of the head stack assembly 33 along the radial direction of the hard disk 32 during the read/write operation. Therefore, the attraction force by the magnet 34 can be ignored during the read/write operation.

In a first step, the first portion 101, on which the connecting pads 112 and 113 are formed, of the flexible cable 37 is positioned on the side wall 118 of the carriage 48, as described with reference to the FIGS. 11 and 13. More particularly, the second portion 102 of the flexible cable 37 is inserted into the grooves 116 through the guide member 99 until the latch portion 114 engages with the recesses 117 in the grooves 116, as shown in FIG. 13. The first portion 101 of the flexible cable 37 is positioned to extend along the side wall 118 of the carriage 48, and the positioning pin 98 is inserted into the positioning aperture 111, so that the flexible cable 37 is automatically fixed to the carriage 48.

In a second step, the first and second head gimbal assembly 49A and 49B are positioned on the carriage 48, and these are tacked by the tacking pin 92, as described with reference to FIG. 9.

In a third step, the connecting pads 112 and 113 on the flexible cable 37 are connected to the connecting pads 66A and 66B on the extending plates 95A and 95B, respectively, and the voice coil wires 123 and 124 are bonded on the connecting pads 115, as described with reference to the FIGS. 11, 12 and 13.

In a fourth step, the structure is cleaned to remove a residual flux or another contaminant by using a well known technology in the art.

In a fifth step, the pivot cartridge 42 is inserted into the apertures 73A, 76A, 55, 76B and 73B, and the structure is fixed by the washer 50 and the nut 51, as described with reference to FIG. 4 or FIG. 10.

In a sixth step, the structure is mounted on the frame 93 by the nut 94, as described with reference to FIG. 10.

Although the present invention has been described by using the embodiment of the data recording device, which includes one carriage 48 and two head gimbal assemblies 49A and 49B, the present invention can be applicable to the data recording device which includes one head stack assembly wherein only one head gimbal assembly is mounted on the carriage, and to the data recording device which includes a plurality of carriages wherein the head gimbal assemblies are mounted on each of the plural carriages. In the case that the plural carriages are used, the voice coil is mounted on one of the plural carriages.

Although the discrete separate tacking pin 92 made of plastic resin is used to tack the head gimbal assemblies 49A and 49B on the carriage 48, as described with reference to FIG. 9, the pin can be integrally formed with the carriage 48.

Figure 17A:
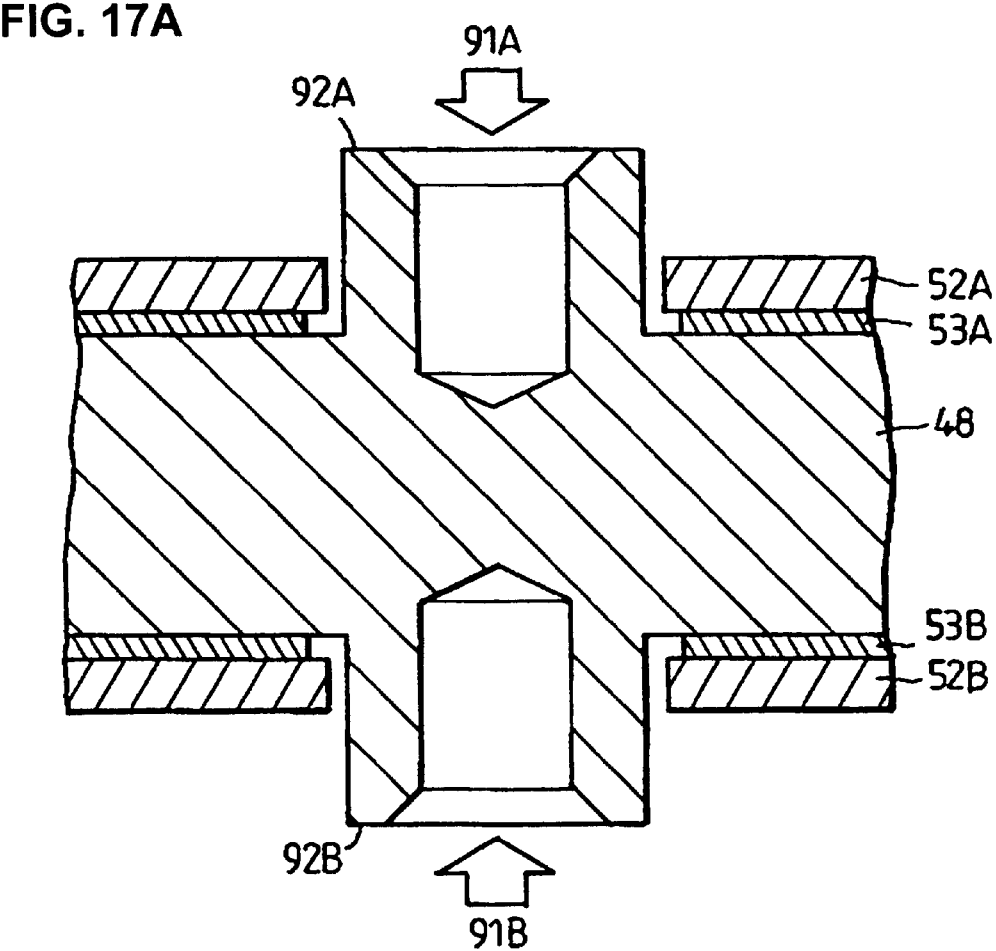
FIG. 17(A) is a schematic sectional view of the head gimbal assemblies and carriage of FIG. 5 shown prior to an alternative tacking operation.
Figure 17B:
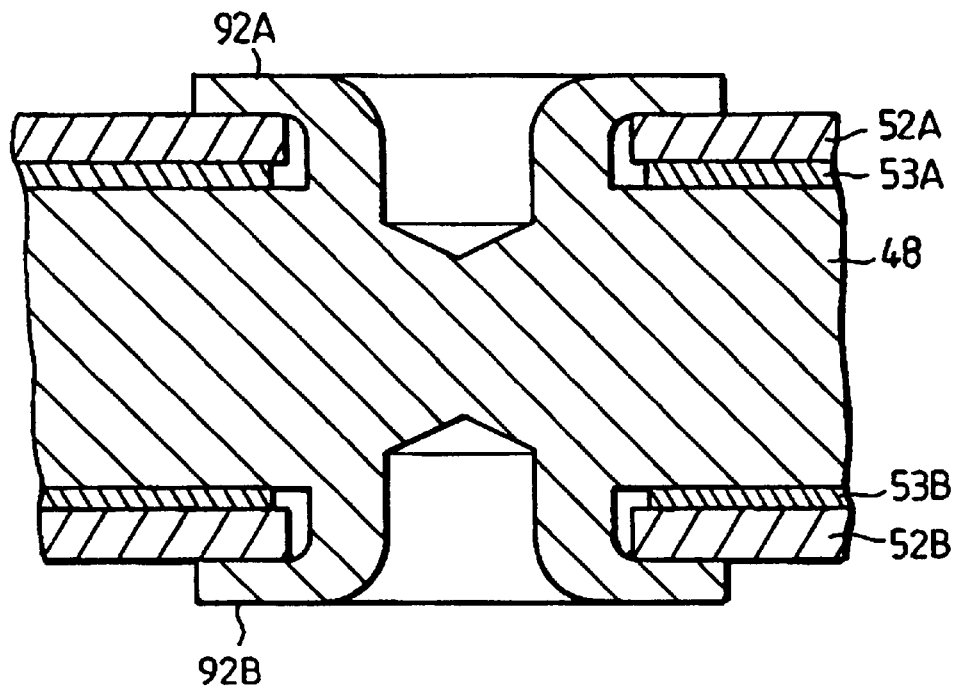
FIG. 17(B) is a schematic sectional view of the head gimbal assemblies and carriage of FIG. 17(A) shown after the alternative tacking operation.

FIGS. 17(A) and 17(B) show the alternative tacking operation of the head gimbal assemblies 49A and 49B on the carriage 48. The tacking pins 92A and 92B are integrally formed with the carriage 48 made of plastic resin. After the positioning of the head gimbal assemblies 49A and 49B on the carriage 48, the tacking pins 92A and 92B are pressed by the force and heat applied in the direction of arrows 91A and 91B, so that the head gimbal assemblies 49A and 49B are tacked to the carriage 48, as shown in FIGS. 17(A) and 17(B).

Figure 18A:
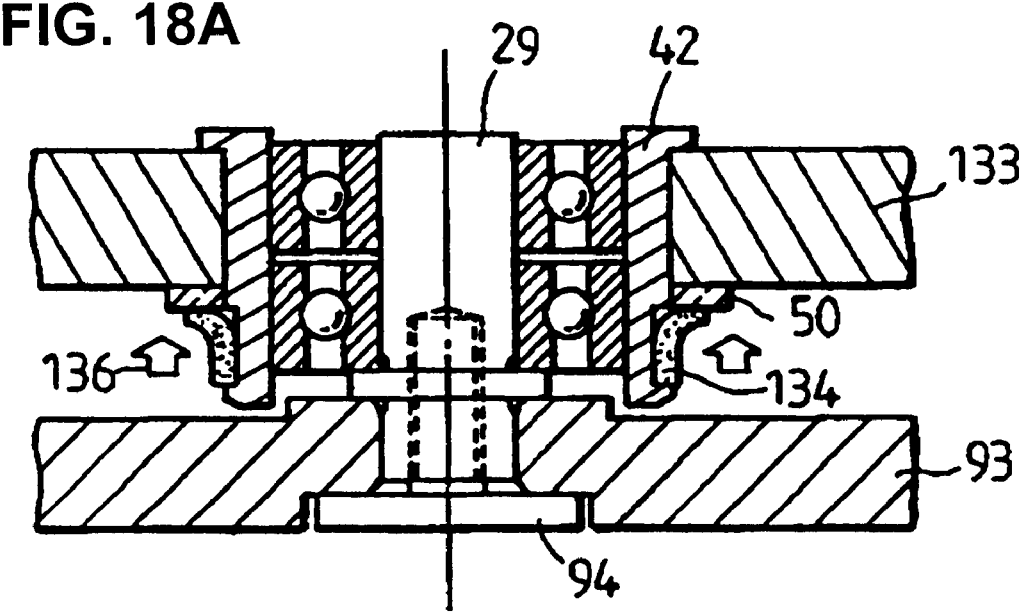
FIG. 18(A) is a sectional view of an alternate configuration of the assembly of FIG. 10.
Figure 18B:
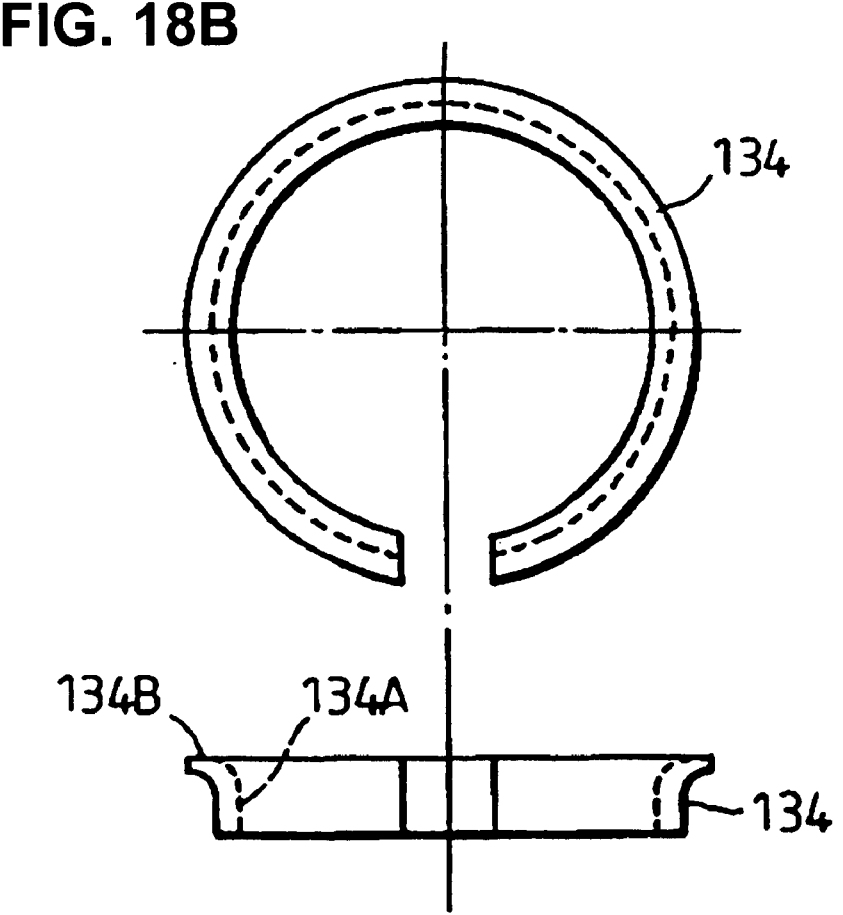
FIG. 18(B) illustrates a spring-type ring used in the configuration of FIG. 18(A).

FIG. 18(A) shows a cross section of the structure in which a spring type ring 134 is used in place of the nut 51 shown in FIG. 10. A block 133 represents the arm member 52A, the suspension load beam 53A, the carriage 48, the suspension load beam 53B and the arm member 52B shown in FIG. 10. The plan view and the side view of the spring type ring 134 are shown in FIG. 18(B). An inside wall 134A and a bottom surface of the spring type ring 134 are fitted into a recess formed on the side surface of the pivot cartridge 42, so that a top edge 134B of the spring type ring 134 pushes the washer 50 and the block 133 in a direction shown by an arrow 136, whereby the washer 50 and the block 133 is fixed to the pivot cartridge 42.

Figure 19A:
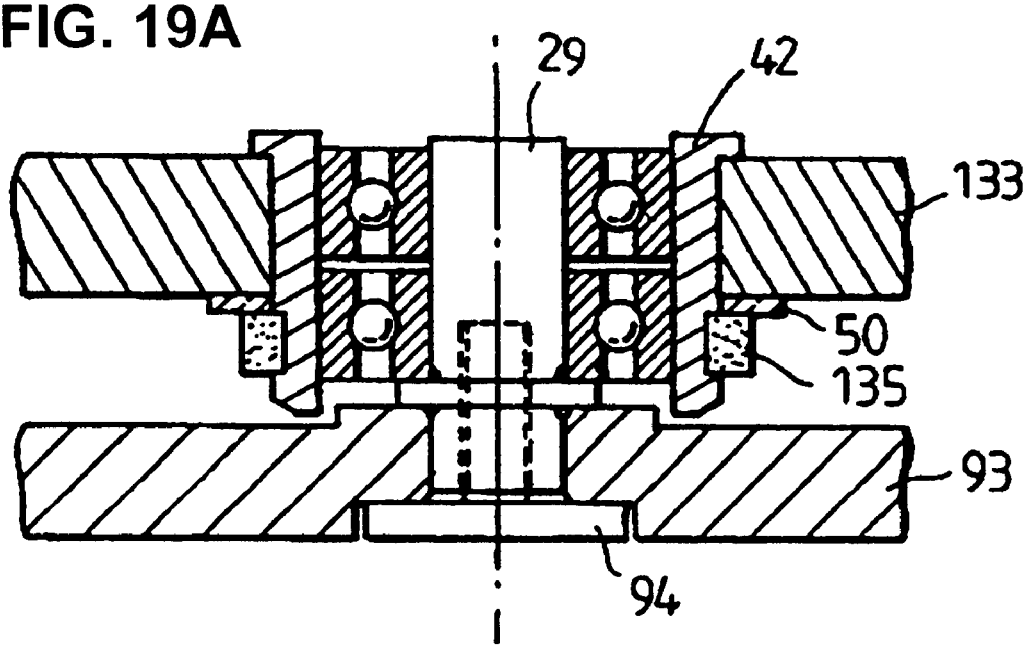
FIG. 19(A) is a sectional view of yet another alternate configuration of the assembly of FIG. 10.
Figure 19B:
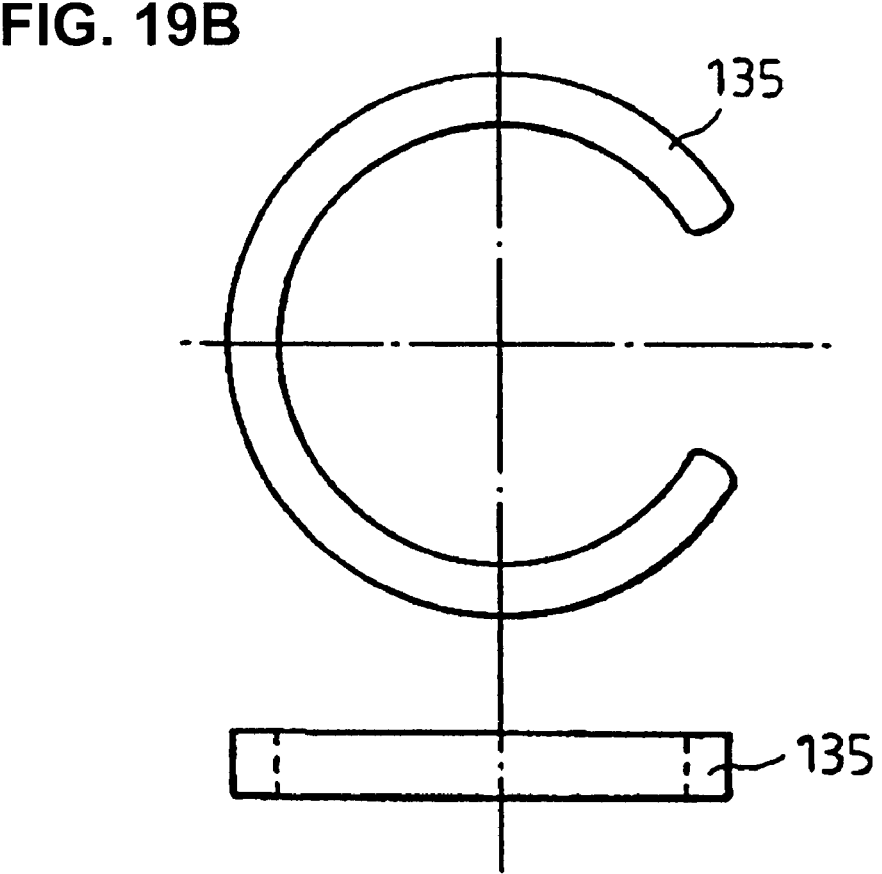
FIG. 19(B) illustrates a C-type ring used in the configuration of FIG. 19(A).

FIG. 19(A) shows a cross section of the structure in which a C type ring 135 is used in place of the nut 51 shown in FIG. 10. The plan view and the side view of the C type ring 135 are shown in FIG. 19(B). The C type ring 135 is fitted into a recess formed on the side surface of the pivot cartridge 42, so that the washer 50 and the block 133 is fixed to the pivot cartridge 42.

While the invention has been shown or described in only some of its forms, it should be apparent to those skilled in the art that it is not so limited, but is susceptible to various changes without departing from the scope of the invention.

What is claimed is:

1. A head stack assembly for a data recording disk drive, comprising:

a carriage on which a coil is mounted, having a first surface and a second surface;

a first head gimbal assembly mounted on said first surface;

a second head gimbal assembly mounted on said second surface; and wherein said carriage has a first aperture into which a pivot member is inserted, and a diameter of said first aperture is larger than a diameter of said pivot member, each of said first head gimbal assembly and said second head gimbal assembly has a second aperture, the center of which is aligned to the center of said first aperture, the diameter of said second aperture is larger than said diameter of said pivot member, said second aperture has a V-shaped edge for aligning said pivot member, and a portion of said carriage is extruded into said first aperture, and said portion extruded from said carriage pushes said pivot member to said V-shaped edge of said second aperture when said pivot member is inserted into said second aperture and said first aperture.

2. A head stack assembly according to claim 1 wherein said V-shaped edge is formed to align the center of said pivot member to a center line extending in a longitudinal direction of said head stack assembly.

3. A head stack assembly according to claim 2, wherein the total weight of said head stack assembly is balanced at a center of said pivot member.

4. A head stack assembly according to claim 3, wherein material of said carriage is plastic resin, and material of said first and second head gimbal assemblies is metal.

5. A head stack assembly for a data recording disk drive, comprising:

a carriage on which a coil is mounted, including a first surface and a second surface and having a first aperture into which a pivot member is inserted, wherein a diameter of said first aperture is larger than a diameter of said pivot member;

a first head gimbal assembly mounted on said first surface;

a second head gimbal assembly mounted on said second surface;

wherein two datum pins for positioning said first head gimbal assembly on said first surface and for positioning said second head gimbal assembly on said second surface are formed on each of said first surface and said second surface of said carriage;

wherein each of said first head gimbal assembly and said second head gimbal assembly includes a suspension load beam and an arm member, said suspension load beam has a rear portion, a bending portion and a front portion supporting a read/write head, and said arm member is stacked to said rear portion; and wherein said suspension load beam has two apertures into which said two datum pins are inserted, respectively, and said suspension load beam has a second aperture, the center of which is aligned to the center of said first aperture, the diameter of said second aperture is larger than said diameter of said pivot member, said second aperture has a V-shaped edge for aligning said pivot member, and a portion of said carriage is extruded into said first aperture, and said portion extruded from said carriage pushes said pivot member to said V-shaped edge of said second aperture when said pivot member is inserted into said second aperture and said first aperture.

6. A head stack assembly according to claim 5 wherein said first aperture is located between said two datum pins.

7. A head stack assembly according to claim 5 wherein a line passing through said two datum pins is inclined from a center line extending in a longitudinal direction of said head stack assembly.

8. A head stack assembly according to claim 7 wherein the total weight of said head stack assembly is balanced at a center of said pivot member.

9. A head stack assembly according to claim 5 wherein said V-shaped edge is formed to align the center of said pivot member to a center line extending in a longitudinal direction of said head stack assembly.

10. A head stack assembly according to claim 9 wherein material of said carriage is plastic resin, and material of said first and second head gimbal assemblies is metal.

* * * * *